United States Patent
Sakakibara et al.

(10) Patent No.: US 10,898,864 B2
(45) Date of Patent: Jan. 26, 2021

(54) POROUS MEMBRANE, POROUS MEMBRANE MODULE, METHOD FOR PRODUCING POROUS MEMBRANE, METHOD FOR PRODUCING CLARIFIED LIQUID, AND METHOD FOR PRODUCING BEER

(71) Applicant: ASAHI KASEI KABUSHIKI KAISHA, Tokyo (JP)

(72) Inventors: Chihiro Sakakibara, Tokyo (JP);
Masatoshi Hashing, Tokyo (JP);
Hirokazu Fujimura, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 16/083,297

(22) PCT Filed: Mar. 9, 2017

(86) PCT No.: PCT/JP2017/009463
§ 371 (c)(1),
(2) Date: Sep. 7, 2018

(87) PCT Pub. No.: WO2017/155034
PCT Pub. Date: Sep. 14, 2017

(65) Prior Publication Data
US 2019/0076790 A1 Mar. 14, 2019

(30) Foreign Application Priority Data
Mar. 11, 2016 (JP) .................................. 2016-048696

(51) Int. Cl.
*B01D 69/08* (2006.01)
*B01D 71/68* (2006.01)
(Continued)

(52) U.S. Cl.
CPC .............. *B01D 69/08* (2013.01); *B01D 29/00* (2013.01); *B01D 39/16* (2013.01); *B01D 63/021* (2013.01);
(Continued)

(58) Field of Classification Search
None
See application file for complete search history.

(56) References Cited

U.S. PATENT DOCUMENTS

| 3,724,672 A | 4/1973 | Leonard et al. |
| 6,165,363 A | 12/2000 | Oishi et al. |

(Continued)

FOREIGN PATENT DOCUMENTS

| CN | 102164656 | 8/2011 |
| EP | 0882494 | 12/1998 |

(Continued)

OTHER PUBLICATIONS

Supplemental European Search Report issued with respect to European Application No. 17763374.0, dated Mar. 1, 2019.
(Continued)

*Primary Examiner* — Chester T Barry
(74) *Attorney, Agent, or Firm* — Greenblum & Bernstein, P.L.C.

(57) ABSTRACT

When the porous membrane, which has two surfaces of a surface A and a surface C, is equally divided in the thickness direction of the porous membrane into three layers of a first layer including the surface A, a second layer that is a central layer in the thickness direction, and a third layer including the surface C, an average trunk size of the third layer is larger than an average trunk size of the second layer, and when a continuous layer from the surface A having a thickness of 10 μm in the first layer is a first layer component, a continuous layer component having a thickness of 10

(Continued)

μm and an average trunk size smaller than an average trunk size of the first layer component is present in the first layer, the second layer, and the third layer other than the first layer component.

34 Claims, 3 Drawing Sheets

(51) Int. Cl.
| | |
|---|---|
| C12H 1/16 | (2006.01) |
| B01D 39/16 | (2006.01) |
| C12C 11/00 | (2006.01) |
| C08J 9/26 | (2006.01) |
| D01F 6/76 | (2006.01) |
| D01F 6/00 | (2006.01) |
| B01D 69/02 | (2006.01) |
| B01D 67/00 | (2006.01) |
| B01D 29/00 | (2006.01) |
| B01D 63/02 | (2006.01) |
| B01D 65/02 | (2006.01) |
| B01D 71/44 | (2006.01) |
| C12H 1/07 | (2006.01) |

(52) U.S. Cl.
CPC ......... *B01D 65/02* (2013.01); *B01D 67/0013* (2013.01); *B01D 67/0016* (2013.01); *B01D 69/02* (2013.01); *B01D 69/087* (2013.01); *B01D 71/44* (2013.01); *B01D 71/68* (2013.01); *C08J 9/26* (2013.01); *C12C 11/00* (2013.01); *C12H 1/063* (2013.01); *C12H 1/16* (2013.01); *D01F 6/00* (2013.01); *D01F 6/76* (2013.01); *B01D 2323/08* (2013.01); *B01D 2323/42* (2013.01); *B01D 2325/022* (2013.01); *B01D 2325/023* (2013.01); *B01D 2325/28* (2013.01)

(56) References Cited

U.S. PATENT DOCUMENTS

| | | | |
|---|---|---|---|
| 2011/0165308 A1* | 7/2011 | Shiki | B01D 71/68 426/592 |
| 2011/0210067 A1 | 9/2011 | Kato et al. | |
| 2012/0305472 A1 | 12/2012 | Yokota et al. | |
| 2013/0292866 A1 | 11/2013 | Shiki | |
| 2014/0091037 A1 | 4/2014 | Shiki | |
| 2017/0001152 A1 | 1/2017 | Park et al. | |

FOREIGN PATENT DOCUMENTS

| | | |
|---|---|---|
| EP | 2022555 | 2/2009 |
| EP | 2332638 A1 | 6/2011 |
| JP | S55-39287 U | 3/1980 |
| JP | 2015-157278 A | 9/2015 |
| WO | 97/22405 A1 | 6/1997 |
| WO | 02/058828 A | 8/2002 |
| WO | 2010/035754 A1 | 4/2010 |
| WO | 2010/035793 A1 | 4/2010 |
| WO | 2015/093705 | 6/2015 |

OTHER PUBLICATIONS

International Search Report issued with respect to Patent Application No. PCT/JP2017/009463, dated May 23, 2017.
International Preliminary Report on Patentability issued with respect to Patent Application No. PCT/JP2017/009463, dated Sep. 11, 2018.

* cited by examiner

POROUS MEMBRANE, POROUS MEMBRANE MODULE, METHOD FOR PRODUCING POROUS MEMBRANE, METHOD FOR PRODUCING CLARIFIED LIQUID, AND METHOD FOR PRODUCING BEER

CROSS REFERENCE TO RELATED APPLICATIONS

The present application is a National Phase Entry of PCT International Application No. PCT/JP2017/009463 filed on Mar. 9, 2017, which claims priority under 35 U.S.C. § 119(a) to Japanese Patent Application No. 2016-048696 filed on Mar. 11, 2016. Each of the above applications is hereby expressly incorporated by reference, in its entirety, into the present application.

TECHNICAL FIELD

The present disclosure relates to a porous membrane having high durability, a porous membrane module, a method for producing the porous membrane, a method for producing clarified liquid by using the porous membrane, and a method for producing beer by using the porous membrane.

BACKGROUND ART

Conventionally, a gel filtration method, a centrifugal separation method, an adsorption separation method, a precipitation method, a membrane filtration method and the like have been used to remove microbial particles, such as yeasts and bacterial bodies, from aqueous solution. However, application of the gel filtration method to industry is difficult, because the method is not suitable for mass processing in which target substance is diluted by solvent used in gel filtration.

The centrifugal separation method is applicable only when the size of microbial particles is a few micrometers or larger, and also the viscosity of aqueous solution is low. The adsorption separation method is applicable to removal of a small amount of specific microbial particles, but this method is not applicable to aqueous solution in which a large amount of various kinds of microorganisms is dispersed. Further, the precipitation method is applicable to treatment of a relatively large amount of aqueous solution, but complete removable of microbial particles by this method alone is impossible.

Meanwhile, a membrane filtration method using a microfiltration membrane or an ultrafiltration membrane is suitable for industrial use, because all kinds of microorganisms are removable, and continuous mass processing is possible.

However, conventional porous membranes had problems that a filtration pressure tends to increase and a filtration speed tends to become lower over time, because the membrane surface is obstructed by formation of a layer of removed microorganisms, their crushed bodies and the like on the membrane surface, and membrane pores are obstructed by adsorption of microparticles of removed substance inside the membrane.

As a membrane structure in which a membrane surface tends not to be obstructed, and that can achieve high permeability, a membrane that can perform so-called depth filtration is developed, in which pore diameters on a surface of the porous membrane are larger than the size of substance to be removed, and a minimum pore diameter layer is present either on the other surface or in a membrane thickness portion, and impurities are captured inside the membrane.

International Publication No. 2002-058828 (Patent Document 1) and International Publication No. 2010-035793 (Patent Document 2) propose membranes of gradient structure in which the pore diameter gradually increases from the outer surface to the inner surface of a hollow fiber membrane.

As liquid to be filtered is supplied from a surface of the membrane having the larger pore diameter in this manner, the substance to be removed penetrates into the inside of the membrane, and is captured during passage through the membrane thickness portion. Therefore, it is possible to prevent a sharp increase in filtration pressure and a drop in the amount of filtrate.

However, in the membrane having such structure, impurities tend to accumulate inside the membrane. Therefore, generally, cleaning is difficult, and the inside of the membrane is not sufficiently cleaned simply by soaking the membrane in cleaning liquid, or circulating the cleaning liquid, and that makes full recovery of performance impossible.

As a method for cleaning such substance accumulated inside a membrane, reverse flow washing is effective, which causes cleaning liquid, such as water, or clear liquid obtained by filtration to flow in a reverse direction to filtration.

SUMMARY

Technical Problem

However, porous membranes of the depth filtration type have characteristics that gaps on the membrane surface and inside the membrane are large, in other words, the structure of a support layer portion is sparse. Therefore, a problem that the mechanical strength becomes relatively low arises. Especially, durability against fatigue caused by repeated application of pressure alternately from two surfaces of the porous membrane, such as filtration-reverse flow washing (hereinafter, referred to as back wash), tends to be low. Therefore, it has been difficult to have both high permeability and high durability against fatigue at the same time.

In view of the aforementioned problems, the present disclosure is directed to providing porous membranes having increased durability against fatigue while maintaining permeability.

Solution to Problem

To solve the aforementioned problems, the inventors continued intensive research, and accomplished the present disclosure by finding that the distribution of trunk sizes of polymer on surfaces and cross-sections of a membrane is important to improve the durability of the porous membrane against fatigue, and that the trunk sizes are controllable by controlling non-solvent vapor during phase separation.

A porous membrane of the present disclosure is a porous membrane including hydrophobic polymer as a main component, wherein when the porous membrane, which has two surfaces of surface A and surface C, is equally divided in the thickness direction of the porous membrane into three layers of a first layer including the surface A, a second layer that is a central layer in the thickness direction, and a third layer including the surface C, an average trunk size of the third layer is larger than an average trunk size of the second layer, and wherein when a continuous layer from the surface A having a thickness of 10 µm in the first layer is a first layer component, a continuous layer component having a thickness of 10 µm and an average trunk size smaller than an average trunk size of the first layer component is present in the first layer, the second layer, and the third layer other than the first layer component.

In the porous membrane of the present disclosure, preferably, a layer component having a thickness of 10 µm and the number of pores larger than the number of pores present in the first layer component is present in the first layer, the second layer, and the third layer other than the first layer component.

In the porous membrane of the present disclosure, preferably, an average pore diameter on the surface A is 1.0 µm or greater and less than 20 µm.

In the porous membrane of the present disclosure, preferably, the number of pores of the first layer>the number of pores of the second layer>the number of pores of the third layer is satisfied.

In the porous membrane of the present disclosure, preferably, an average pore diameter of the first layer<an average pore diameter of the second layer<an average pore diameter of the third layer is satisfied, and the average pore diameter of the third layer is at least 3.0 times as large as that of the first layer.

In the porous membrane of the present disclosure, preferably, the porous membrane has a hollow fiber shape.

In the porous membrane of the present disclosure, preferably, the surface A is an outer surface, and the surface C is an inner surface.

In the porous membrane of the present disclosure, preferably, the ratio of the outer diameter to the inner diameter of the porous membrane is 1.4 or greater and less than 2.5.

In the porous membrane of the present disclosure, preferably, the inner diameter of the porous membrane is 1000 µm or greater and less than 2000 µm.

In the porous membrane of the present disclosure, preferably, a rejection pore diameter of the porous membrane is 0.1 µm or greater and less than 1 µm.

In the porous membrane of the present disclosure, preferably, the porosity of the porous membrane is 75% or greater and less than 90%.

In the porous membrane of the present disclosure, preferably, an average value of ten largest diameter trunks present on the surface C is 40 µm or greater.

In the porous membrane of the present disclosure, preferably, base material constituting the porous membrane is polysulfone-based polymer.

Preferably, the porous membrane of the present disclosure includes polyvinyl pyrrolidone.

Preferably, the porous membrane of the present disclosure includes polysulfone-based polymer, hydrophilic polymer, solvent of polysulfone-based polymer, and non-solvent of polysulfone-based polymer.

In the porous membrane of the present disclosure, preferably, the average trunk size of the first layer component is 0.3 µm or greater.

In the porous membrane of the present disclosure, preferably, the average trunk size of the first layer component is less than the average trunk size of the second layer and the average trunk size of the third layer, and 0.3 µm or greater.

In the porous membrane of the present disclosure, preferably, the average trunk size of the third layer is 3.0 µm or greater.

A method for producing a porous membrane of the present disclosure is a method for producing a porous membrane, comprising the steps of causing internal solidification liquid to flow out from an inside flow path of a double tubular nozzle, and causing membrane-forming solution including hydrophobic polymer and solvent to flow out from an outside flow path of the double tubular nozzle simultaneously; and solidifying the membrane-forming solution in external solidification liquid after the membrane-forming solution has passed through an air-gap portion, wherein the temperature of the air-gap portion and the temperature of a surface of the external solidification liquid located vertically under the air-gap portion are controlled to be equal to each other.

In the method for producing a porous membrane of the present disclosure, preferably, the temperature of the air-gap portion and the temperature of the external solidification liquid located vertically under the air-gap portion are controlled simultaneously by covering the air-gap portion and the external solidification liquid by a unitary hollow cylindrical object.

In the method for producing a porous membrane of the present disclosure, preferably, a water vapor amount of the air-gap portion in the hollow cylindrical object is 0.01 g or greater and less than 1.0 g.

In the method for producing a porous membrane of the present disclosure, preferably, the absolute humidity of the air-gap portion in the hollow cylindrical object is 300 $g/m^3$ or higher and lower than 540 $g/m^3$.

In the method for producing a porous membrane of the present disclosure, preferably, the porous membrane resides in a section of the external solidification liquid having the temperature equal to the temperature of the air-gap portion for 0.1 second or longer.

In the method for producing a porous membrane of the present disclosure, preferably, the external solidification liquid has higher solidifying power for the membrane-forming solution, compared with the internal solidification liquid, and includes water as a main component.

In the method for producing a porous membrane of the present disclosure, preferably, the internal solidification liquid is aqueous solution including solvent of the hydrophobic polymer at 70 wt % or greater and less than 100 wt %.

In the method for producing a porous membrane of the present disclosure, preferably, the membrane-forming solution includes hydrophilic polymer.

In the method for producing a porous membrane of the present disclosure, preferably, a part of the hydrophilic polymer is removed by using aqueous solution including oxidizing agent simultaneously with the solidification step, or after the solidification step.

A method for producing clarified liquid of the present disclosure comprises a filtration step of filtering liquid including suspension substance by using the porous membrane of the present disclosure.

In the method for producing clarified liquid of the present disclosure, preferably, the liquid including the suspension substance is fermented liquid.

In the method for producing clarified liquid of the present disclosure, preferably, the fermented liquid is beer fermented liquid.

In the method for producing clarified liquid of the present disclosure, preferably, the filtration is inside-out filtration.

In the method for producing clarified liquid of the present disclosure, preferably, the method further comprises the step of performing reverse flow washing on the porous membrane by using filtrate obtained in the filtration step.

A porous membrane module of the present disclosure includes the porous membrane of the present disclosure.

A first method for producing beer is a method comprising at least the steps of: fermenting liquid including at least malt; and filtering the liquid in which fermented yeast is dispersed, wherein the step of filtering uses a porous membrane in which pore diameters change in the thickness direction of the membrane, and wherein when the porous membrane is equally divided in the thickness direction of the porous membrane into three layers, an average trunk size of a layer closer to an upstream-side surface of filtration is greater than an average trunk size of a central layer of the three layers equally divided in the thickness direction, and wherein the porous membrane includes a layer having a thickness of 10 μm and an average trunk size smaller than an average trunk size of a layer having a thickness of 10 μm continuing from a downstream-side surface of filtration in the other region of the membrane.

A second method for producing beer of the present disclosure is a method comprising at least: a fermentation step of fermenting liquid including at least malt; a first filtration step of filtering first liquid in which fermented yeast is dispersed by a porous membrane; a back wash step of causing liquid for cleaning the membrane in a reverse direction to the direction of filtering the first liquid after the first filtration step; and a second filtration step of filtering, after the back wash step, second liquid in which fermented yeast is dispersed by the porous membrane on which the back wash step was performed, wherein when the porous membrane is equally divided in the thickness direction of the porous membrane into three layers, an average trunk size of a layer closer to an upstream-side surface of filtration is greater than an average trunk size of a central layer of the three layers equally divided in the thickness direction, and wherein the porous membrane includes a layer having a thickness of 10 μm and an average trunk size smaller than an average trunk size of a layer having a thickness of 10 μm continuing from a downstream-side surface of filtration in the other region of the membrane.

According to the present disclosure, even if liquid, such as fermented liquid, having a high viscosity is filtered, high permeability is maintainable for a long period of time in depth filtration, and easy cleaning by back wash is possible. Further, it is possible to provide a long-life porous membrane having high durability against repeated filtration-back wash, and also a method for producing the porous membrane. Further, the present disclosure can provide a method for producing clarified liquid by using the porous membrane.

Further, the present disclosure provides a method for producing clarified liquid that includes a filtration step of filtering liquid including suspension substance by the aforementioned porous membrane. According to such a production method, liquid after sufficient removal of suspension substance is continuously obtainable, because filtration is performed by the aforementioned porous membrane.

BRIEF DESCRIPTION OF THE DRAWINGS

FIG. 3II A cross-section of a double tubular nozzle

DESCRIPTION OF EMBODIMENTS

Figure 1:
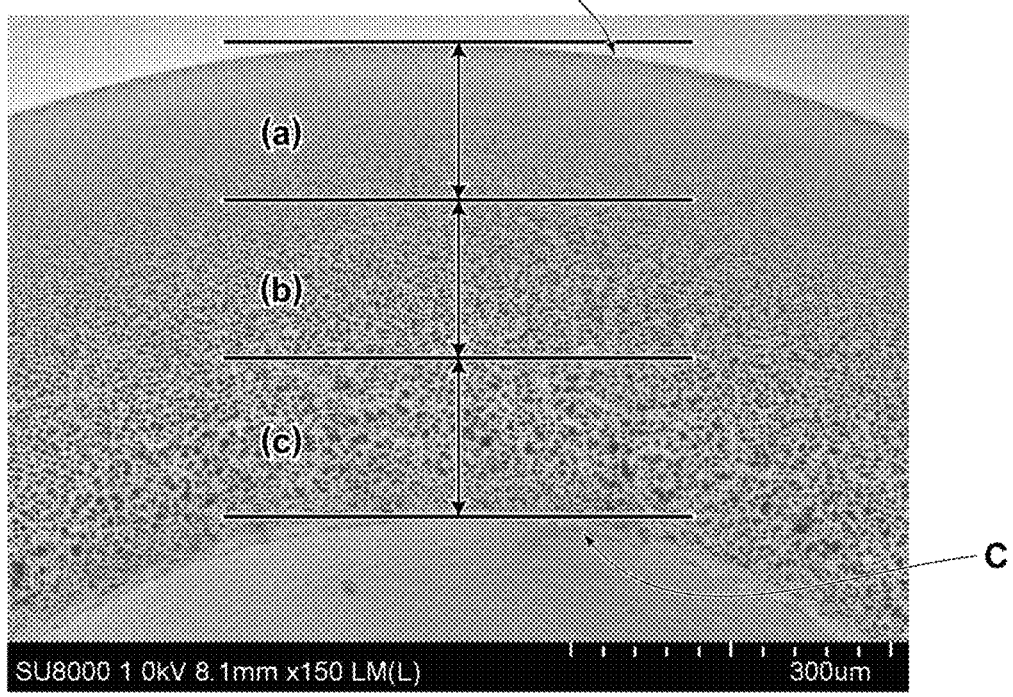
FIG. 1 A partial close-up view of a cross-section in a direction orthogonal to the longitudinal direction of a hollow fiber membrane using an embodiment of a porous membrane of the present disclosure FIG. 2 A schematic diagram of the cross-section illustrated in FIG. 1
Figure 2:
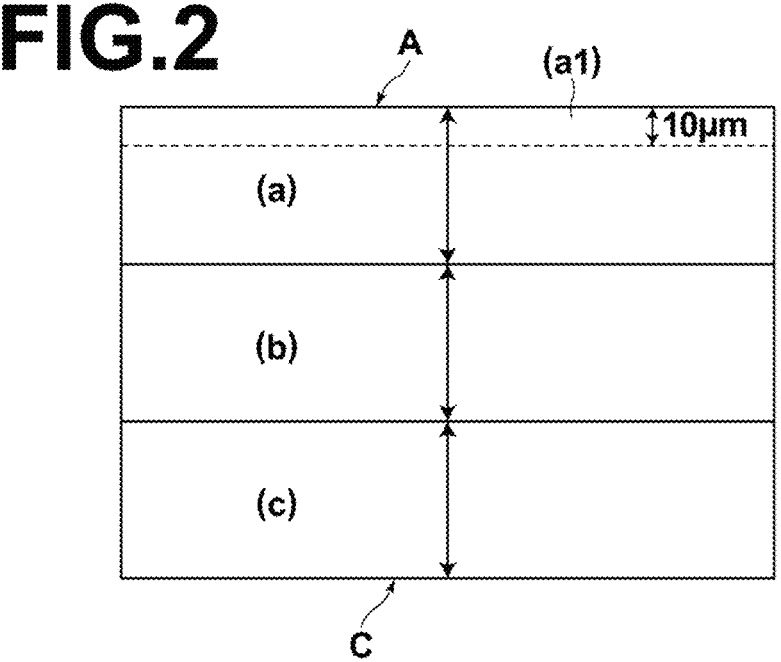

Hereinafter, a preferred embodiment of the present disclosure will be described in detail. The porous membrane may be in any form, such as a hollow fiber membrane and flat membrane, but here, an embodiment of a hollow fiber membrane will be described. FIG. 1 is a partial close-up view of a cross-section in a direction orthogonal to the longitudinal direction of the hollow fiber membrane of the present embodiment. FIG. 1 shows surface A, which is an outer surface of the hollow fiber membrane, and surface C, which is an inner surface of the hollow fiber membrane. FIG. 2 is a schematic diagram of the cross-section illustrated in FIG. 1.

The porous membrane according to the present embodiment includes hydrophobic polymer as a main component. As illustrated in FIG. 1, when the thickness of the porous membrane, which has two surfaces of surface A and surface C, is equally divided into three layers of a first layer (a) including surface A, second layer (b) that is a central layer as to the thickness of the membrane, and a third layer (c) including surface C, 1) an average trunk size of the third layer (c) is larger than an average trunk size of the second layer (b), and 2) when a continuous layer from surface A having a thickness of 10 μm in the first layer (a) is a first layer component (a1), and an average trunk size of the first layer component (a1) is S(a1), a continuous layer having a thickness of 10 μm and an average trunk size smaller than S(a1) is present in the first layer (a) to third layer (c) other than the first layer component (a1).

The conditions 1) and 2) indicate that when a change in trunk size is observed from surface C toward surface A, the trunk sizes decrease from the third layer (c), which has the largest average pore diameter, toward the second layer (b) once, but at the end, the trunk sizes in the first layer component (a1) having a thickness of 10 μm, which is the outermost layer in the first layer (a) continuing from surface A, are larger again, compared with a layer having a thickness of 10 μm located toward the inside of the first layer component (a1), in other words, the trunk sizes in the membrane thickness portion change from surface C toward surface A to be large, small, and large. This structure can provide a porous membrane having high durability against repetitive fatigue caused by alternate application of pressure from surface C and surface A, i.e., a porous membrane having high fatigue endurance.

The hydrophobic polymer represents a hydrophobic resin component having excellent heat resistance and chemical resistance, and examples of this resin component are polysulfone, polyethersulfone, polyethylene, polypropylene, polytetrafluoroethylene, polyvinylidene fluoride, and the like. Among these, polysulfone-based polymer, such as polysulfone and polyethersulfone, is particularly preferable, because it has excellent resistance against alkaline aqueous solution, which is used for cleaning, and excellent strength against a change in temperature and a change in pressure.

Preferably, the polysulfone-based polymer has molecular weight in the order of 10,000 to 100,000, and examples of polysulfone are Udel (Registered Trademark) P-3500LCD and P-1700LCD manufactured by Solvay S.A., Ultrason (Registered Trademark) S6010, S3010, and S2010 manufactured by BASF Corporation, and the like. Further, examples of polyethersulfone are Ultrason (Registered Trademark) E6020P, E3010, E2020P, and E2010 manufactured by BASF Corporation, Sumikaexcel (Registered Trademark) 5200P, 4800P, 4100P, and 3600P manufactured by Sumitomo Chemical Co., Ltd., and the like. Further, polyethersulfone including a hydroxyl group at its end may be used.

The porous membrane of the present embodiment may be a mixture with another component, such as hydrophilic polymer, as long as such hydrophobic polymer is the main component. Here, the main component means a component included at 50 wt % or greater.

In the porous membrane of the present embodiment, surface A and surface C represent two surfaces of the porous membrane, respectively.

In the present embodiment, a method for equally dividing a porous membrane in the thickness direction represents a method of imaging a cross-section of the porous membrane by an SEM (Scanning Electron Microscope), and equally dividing the thickness portion of the membrane into three parts.

Trunks of the porous membrane of the present embodiment are rod-shaped bodies constituting a frame structure of the porous membrane forming a three-dimensional network, and define, between two adjacent pores, each pore in any cross-section of the porous membrane.

An average trunk size represents an average value of measured sizes of trunks present in each of the first layer (a) to the third layer (c). For example, the trunk sizes are measured by imaging a cross-section of a porous membrane by an SEM, and drawing a straight line in the membrane thickness direction on the obtained photograph in such a manner to go across the membrane, and measuring distances between all the pores present on the straight line. The measured values are used as the diameters of the trunks.

Here, the trunks represent those present on a surface layer of a cross-section of a porous membrane, and structures observable in the depth direction should not be considered as the trunks. When a structure on the surface layer and a structure in the depth direction are not easily distinguishable from each other, pores may be embedded with resin or the like before cut, so that the structure in the depth direction is not observable.

In the porous membrane of the present embodiment, preferably, an average trunk size of the third layer (c) is more than 1.0 times and less than 5.0 times as large as that of the second layer (b), and 1.4 times or more and less than 4.5 times is more preferable. It is possible to maintain the high mechanical strength of surface C, which receives the highest pressure during filtration, by making the trunk size of the third layer (c) larger than the trunk size of the second layer (b), and as a result, it is possible to prevent a fracture of the membrane even if high filtration pressure is applied instantaneously. Preferably, an average trunk size of the third layer (c) is 3.0 µm or greater, and 4.5 µm or greater is more preferable. Such trunk sizes can provide sufficient pressure resistance for filtration.

Further, in the porous membrane of the present embodiment, preferably, an average value of ten largest diameter trunks present on surface C is 40 µm or greater. The presence of thick trunks not only in the membrane thickness portion but also on surface C, so as to support the surface as support rods, further improves the pressure resistance. A method for measuring trunks present on surface C will be described later in detail.

Meanwhile, the second layer (b), which is the central layer, can have increased gaps in the membrane by relatively reducing the trunk sizes, and that can reduce membrane resistance, and make high permeability maintainable. When an average trunk size of the third layer (c) becomes 5.0 times or more as large as that of the second layer (b), the trunk sizes in the second layer (b) become too small, and the strength is not maintainable. Hence, a risk of crush of the membrane during operation arises.

As described above, in the porous membrane of the present embodiment, a continuous layer component having an average trunk size smaller than average trunk size S(a1) of the first layer component (a1) is present toward the third layer (c) side of the first layer component (a1). Therefore, the sizes of trunks arranged in a region in the vicinity of surface A are larger than the sizes of trunks located toward the inside of the region. Hence, when pressure is applied to surface A, the membrane can have high durability against crush.

When this characteristic and the relationship of an average trunk size of the third layer (c)>an average trunk size of the second layer (b) are satisfied in combination, a porous membrane that is strong against pressure from both surface C and surface A is obtainable. Accordingly, high durability against repetitive fatigue caused by filtration and back wash is exhibitable.

Preferably, an average trunk size of the first layer component (a1) having a thickness of 10 µm continuing from surface A is 0.3 µm or greater, and 0.5 µm or greater is more preferable, and 0.9 µm or greater is even more preferable. Further, 1.5 µm or greater is more preferable. When the sizes are in such a range, sufficient fatigue endurance is achievable even under a tough operation condition, in which back wash is performed frequently.

Further, in the porous membrane of the present embodiment, when the number of pores present in the first layer component (a1) having a thickness of 10 µm continuing from surface A in the first layer (a) is P(a1), preferably, a layer component having a thickness of 10 µm and the number of pores larger than P(a1) is present in the first layer (a) to the third layer (c) other than the first layer component (a1). This indicates that the number of pores in the membrane thickness portion in the vicinity of surface A is relatively small. Such structure can increase a linear speed in the vicinity of surface A when back wash is performed from the surface, and an adhesion to walls of pores is efficiently cleanable.

The number of pores is measured in a similar manner to the aforementioned method for calculating an average trunk size, for example, by imaging a cross-section of a porous membrane by an SEM, and drawing a straight line perpendicularly in such a manner to go across the membrane thickness on the obtained photograph, and counting the number of pores present on the straight line. Here, the pores represent those present on a surface layer of a cross-section of a porous membrane in a similar manner to the method for recognizing trunks, and structures observable in the depth direction are ignored.

Further, in the porous membrane of the present embodiment, preferably, the number of pores present in each of the first layer (a) to the third layer (c) satisfies the condition that the number of pores of the first layer (a)>the number of pores of the second layer (b)>the number of pores of the third layer (c). Such variation in the numbers of pores reduces a risk of clogging in the first layer (a), which includes a rejection pore diameter, because a large number of pores is present. Meanwhile, the third layer (c) of sparse structure has a small number of pores, and that relatively increases the ratio of trunks, and high strength is maintainable. The number of pores in the second layer (b) is between the numbers of the other layers, and that can make the permeability and the fatigue endurance of the membrane well-balanced.

Further, in the porous membrane of the present embodiment, preferably, an average pore diameter of each of the first layer (a) to the third layer (c) satisfies the condition that an average pore diameter of the first layer (a)<an average pore diameter of the second layer (b)<an average pore diameter of the third layer (c). Preferably, the average pore diameter of the third layer (c) is 3.0 times or more as large as that of the first layer (a), and 5.0 times or more is more preferable. Such structure can provide a more excellent effect of depth filtration, in which removed substance is held in the membrane, and high permeability is maintainable for a long period of time. Further, when pore diameters are distributed in such a manner to satisfy the condition that the average pore diameter of the first layer (a)<the average pore diameter of the second layer (b)<the average pore diameter of the third layer (c), impurities accumulated inside the membrane are efficiently removable when pressure is applied from surface A during back wash, and cleaning characteristics are improved.

Preferably, pore diameters in the third layer (c) are distributed in such a manner that a portion in contact with surface C has the largest pore diameter. This distribution can facilitate entrance of suspension substance from surface C, and maximize the effect of the depth filtration.

In the porous membrane of the present embodiment, the pore diameter represents the size of a pore expressed in the diameter of a corresponding circle. The average pore diameter of each of the first layer (a) to the third layer (c) is measured, for example, by using a method of imaging a cross-section of a porous membrane by an SEM, and drawing a straight line perpendicularly on the obtained photograph in such a manner to go across the membrane thickness, and extracting all the pores present on the straight line for each of the layers, and calculating the diameter of a corresponding circle based on the area of each pore, and obtaining an average of the calculated values.

Further, in the porous membrane of the present embodiment, preferably, the average pore diameter on surface A is 1.0 µm or greater and less than 20 µm. When the average pore diameter is 1.0 µm or greater, even if protein or the like having a low molecular weight is passed toward the filtrate side, and adsorbed on the membrane surface, it does not act as resistance, and excellent permeability is maintainable. Further, when the average pore diameter on surface A is 20 µm or greater, it becomes difficult to obtain an appropriate rejection pore diameter, and therefore, less than 20 µm is preferable.

The form of the porous membrane of the embodiment is not particularly limited, and a flat membrane, a tubular membrane, a hollow fiber membrane, and the like are applicable, and the hollow fiber membrane is particularly preferable among them. The hollow fiber membrane is a membrane in hollow ring shape, and such a shape can increase the area of the membrane per module unit volume, compared with a membrane having a flat surface. Further, in filtration of liquid, such as fermented liquid, having a relatively high viscosity, a hollow-fiber-shaped module, which has a little dead space and is easily cleanable, is preferably used.

When the porous membrane of the present embodiment has a hollow fiber shape, and for example, liquid, such as fermented liquid, having a high viscosity is treated, inside-out filtration is often performed to increase a linear flux. When the inside-out filtration is performed, preferably, surface A is an outer surface, and surface C is an inner surface, as in the aforementioned embodiment. That is because the effect of depth filtration is achievable by making the structure of the inner surface side sparse. In contrast, when the membrane is used in outside-in filtration, preferably, surface A is an inner surface, and surface C is an outer surface.

Further, when the porous membrane of the present embodiment has a hollow fiber shape, preferably, the ratio of the outer diameter to the inner diameter is 1.4 or greater and less than 2.5, and 1.5 or greater and less than 2.3 is more preferable. When the ratio is 1.4 or greater, a sufficient strength is achievable. When the ratio is less than 2.5, the diameter of the hollow fiber membrane does not become too large, and a large membrane area is secured when the membrane is provided in a module, and high treatment performance per module is maintainable.

Further, when the porous membrane of the present embodiment has a hollow fiber shape, preferably, the inner diameter is 1000 µm or greater and less than 2000 µm. When the inner diameter is 1000 µm or greater, even if suspension substance, such as microbial particles, which tends to cohere, is filtered, it is possible to continue filtration without obstruction of the inside of the hollow fiber by the cohered suspension substance. Further, when the inner diameter is less than 2000 µm, the diameter of a porous hollow fiber membrane does not become too large, and a large effective membrane area per module is secured, and a drop in filtration performance is preventable.

Further, in the porous membrane of the present embodiment, preferably, a rejection pore diameter is 0.05 µm or greater and less than 1 µm, and more preferably, the rejection pore diameter is 0.1 µm or greater and less than 1 µm, and even more preferably, the rejection pore diameter is 0.2 µm or greater and 0.8 µm or less. When the rejection pore diameter is 0.05 µm or greater, passage resistance tends not to increase, and an increase in pressure needed for filtration is preventable. For example, when liquid including microbial particles is filtered, it is possible to prevent obstruction of a membrane surface caused by fracture and deformation of microbial particles, a drop in filtration efficiency, and the like. Further, when the rejection pore diameter is less than 1 µm, sufficient fraction characteristics are achievable.

Here, the rejection pore diameter means the diameter of a particle when a passage rejection rate of the particle is 90% when particle dispersion liquid, in which particles of a fixed diameter are dispersed, is filtered by using a porous membrane. Specifically, for example, dispersion liquid of at least four kinds of uniform latex particles having different particle diameters is filtered by a porous membrane, and a passage rejection rate is obtained based on the ratio of a concentration before filtration to a concentration after filtration. The size of a particle when this passage rejection rate is 90% is calculated, and the size is determined as the rejection pore diameter. Here, the sizes of the four kinds of particles are selected in such a manner to include at least one particle size with a passage rejection rate of 50% or less, and at least one particle size with a passage rejection rate of 90% or higher.

Further, in the porous membrane of the present embodiment, preferably, the porosity of the porous membrane is 70% or higher and less than 90%, and 75% or higher and less than 85% is more preferable. When the porosity is 70% or higher, the membrane structure is sufficiently sparse, and high permeability is achievable. When the porosity is less than 90%, sufficient mechanical strength is achievable.

Here, the porosity was obtained by using a method of calculating the volume of a pore portion based on the weight of a membrane in dry condition and the weight of the membrane in wet condition. The details of the procedure will be described later.

Preferably, the base material of the porous membrane of the present embodiment is polysulfone-based polymer. Such a porous membrane has even more excellent strength against a change in temperature and a change in pressure, and can maintain high filtration performance for a long period of time.

Preferably, the porous membrane of the present embodiment includes polyvinyl pyrrolidone (hereinafter, referred to as PVP). When PVP is included, a hydrophilic layer is formed on the membrane surface and trunks, and impurities tend not to be adsorbed, and cleaning becomes easy.

Preferably, PVP having a K value, which is an index of molecular weight, of 30 or greater and less than 120 is used, and 80 or greater and less than 115 is more preferable. When the K value is 30 or greater, a part of PVP remains in the membrane without completely flowing out during spinning, and a sufficient hydrophilic effect is achievable. When the K value is 120 or greater, an excessive amount of PVP remains, and a risk of obstruction of the minimum pore diameter layer of the membrane arises.

As an embodiment of a method for producing a porous membrane of the present disclosure, a method for producing a hollow-fiber-shaped porous membrane (hereinafter, referred to as a hollow fiber porous membrane) will be described. The hollow fiber porous membrane is easily obtainable by causing internal solidification liquid to flow out from an inside flow path of a double tubular nozzle and causing membrane-forming solution including hydrophobic polymer and solvent to flow out from an outside flow path of the double tubular nozzle simultaneously, and solidifying the membrane-forming solution in external solidification liquid after the membrane-forming solution has passed through an air-gap portion. The method for producing the porous membrane of the present embodiment is characterized in that the temperature of the air-gap portion and the temperature of a surface of the external solidification liquid under the air-gap, which the porous membrane will enter, are controlled to be equal to each other.

Figure 3:
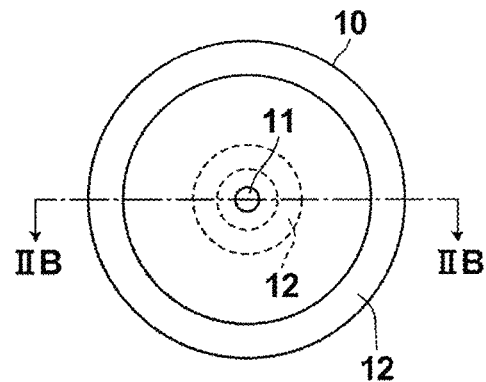
FIG. 3I A cross-section of a double tubular nozzle
Figure 3:
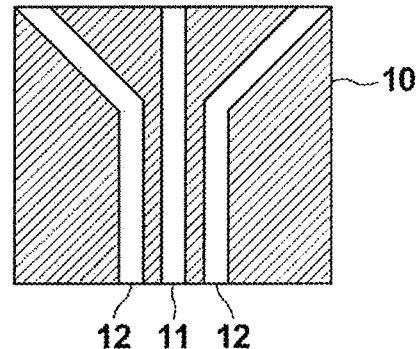

FIGS. 3I and 3II are cross-sections of a double tubular nozzle 10, which is preferable for producing the hollow fiber porous membrane of the present embodiment. FIG. 3I is a cross-section in a direction orthogonal to the longitudinal direction of the double tubular nozzle 10, and FIG. 3II is a cross-section at IIB-IIB line in FIG. 3I.

Here, as illustrated in FIG. 3I and FIG. 3II, in the double tubular nozzle 10, an inside flow path 11 is formed in a central part of the nozzle, and an outside flow path 12 is formed to surround the inside flow path 11, and a divisional wall is formed between the two flow paths. Preferably, the inside flow path 11 of the double tubular nozzle 10 has a circular cross-section perpendicular to the longitudinal direction of the nozzle, and the outside flow path 12 of the double tubular nozzle has a ring-shaped cross-section perpendicular to the longitudinal direction of the nozzle, and the two flow paths are concentric (share the center).

Preferably, the internal solidification liquid is aqueous solution including solvent of hydrophobic polymer at 70 wt % or greater and less than 100 wt % with respect to the total weight of the internal solidification liquid, and 75 wt % or greater and less than 98 wt % is more preferable. When the ratio is 70 wt % or greater, it is possible to increase the diameters of pores on the inner surface and to control the structure in such a manner to be appropriate for depth filtration. For reducing a change in performance caused by uneven temperatures of liquid, preferably, the temperature of the internal solidification liquid is in a range of −30 to +30° C. of the temperature of the membrane-forming solution flowing out from the double tubular nozzle 10.

The hydrophobic polymer represents a hydrophobic resin component having excellent heat resistance, chemical resistance and the like, and examples of this resin component are polysulfone, polyethersulfone, polyethylene, polypropylene, polytetrafluoroethylene, polyvinylidene fluoride, and the like. Among these, polysulfone-based polymer, such as polysulfone and polyethersulfone, is particularly preferable, because it has excellent compatibility with solvent and homogeneous membrane-forming solution is easily preparable. Preferably, the polysulfone-based polymer has a molecular weight in the order of 10,000 to 100,000, and examples of polysulfone are Udel (Registered Trademark) P-3500LCD and P-1700LCD manufactured by Solvay S.A., Ultrason (Registered Trademark) S6010, S3010, and S2010 manufactured by BASF Corporation, and the like. Further, examples of polyethersulfone are Ultrason (Registered Trademark) E6020P, E3010, E2020P, and E2010 manufactured by BASF Corporation, Sumikaexcel (Registered Trademark) 5200P, 4800P, 4100P, and 3600P manufactured by Sumitomo Chemical Co., Ltd., and the like. Further, polyethersulfone including a hydroxyl group at its end may be used.

Examples of solvent of hydrophobic polymer are N-methyl-2-pyrrolidone (NMP), dimethylformamide (DMF), dimethylacetamide (DMAC), dimethyl sulfoxide (DMSO), and the like, and each of these may be used alone or in mixture. For example, when polysulfone is used as hydrophobic polymer, N-methyl-2-pyrrolidone and dimethylacetamide are preferable, and when PVP is used as hydrophilic polymer mixed into the membrane-forming solution, as will be described later, N-methyl-2-pyrrolidone is more preferable.

Preferably, the external solidification liquid has higher solidifying power for the membrane-forming solution than the internal solidification liquid, and the external solidification liquid includes water as a main component. The main component means a component included at 50 wt % or greater. When such external solidification liquid is used, the pore diameter of the inner surface becomes larger than the pore diameter of the outer surface, and membrane structure appropriate for depth filtration is obtainable.

The solidifying power is measurable by thinly casting an equal amount of transparent membrane-forming solution onto glass so as to have the same thickness, and visually observing a speed at which turbidity is induced when a fixed amount of external solidification liquid and a fixed amount of internal solidification liquid are dropped thereto under the same temperature and humidity condition. Solidification liquid having a higher speed of inducing turbidity represents solidification liquid having higher solidifying power.

Preferably, the temperature of the external solidification liquid is 30° C. or higher and 95° C. or lower, and 50° C. or higher and 90° C. or lower is more preferable.

The aforementioned air-gap portion represents a section from a discharge hole of the double tubular nozzle 10 to a surface of the external solidification liquid. Specifically, the expression "passed through an air-gap portion" means that membrane-forming solution that has flowed out from the double tubular nozzle 10 is passed through gas, such as air and inert gas, so as not to contact the external solidification liquid immediately.

In the method for producing the porous membrane of the present embodiment, it is important to make the temperature of the air-gap portion and the temperature of a surface of the external solidification liquid located vertically under the air-gap portion, and which the membrane-forming solution enters, are controlled to be equal to each other.

Here, the temperature of the external solidification liquid is the temperature of a layer including the surface of the external solidification liquid, and having a minimum depth for measuring the temperature, and for example, represents the temperature of the layer to a depth of 0.5 cm.

The structure of the outer surface of the hollow fiber porous membrane and the membrane thickness portion in the vicinity of the outer surface is determined mainly by three conditions, i.e., a condition in the air-gap portion, a condition on the surface of the external solidification liquid (at the time of entering the liquid), and a condition inside the external solidification liquid. In the air-gap portion, phase separation of the outer surface is initiated, and separation into trunks and pores occurs. Next, the phase separation of the outer surface ends on the surface of the external solidification liquid, and solidification occurs. Meanwhile, the external solidification liquid, which is non-solvent, enters the membrane thickness portion, and phase separation is initiated, and trunks and pores in the first layer component (a1) in the vicinity of the outer surface grow. The phase separation is sequentially initiated from the vicinity of outer surface toward the inner surface.

Then, inside the external solidification liquid, the phase separation of the first layer component (a1) in the vicinity of the outer surface ends, and solidification occurs. In the inside membrane thickness portion (the portion of the first layer (a) to the third layer (c) other than the first layer component (a1)), trunks and pores grow sequentially by phase separation, and solidification occurs when a certain amount of non-solvent has entered, and structure is determined.

As described above, it is extremely important to control the conditions of the air-gap portion and the external solidification liquid, and a method for adjusting the temperature and the humidity of the air-gap portion, and the temperature, composition and the like of the external solidification liquid may be considered to control the conditions.

However, conventionally, the surface of the external solidification liquid and the inside of the external solidification liquid were considered as the same part, and an effect caused by each of them was not analyzed separately.

Even if control of the air-gap portion and the whole external solidification liquid to the same temperature is studied, the actual temperature of the surface of the external solidification liquid is lower than the actual temperature of the inside of the external solidification liquid due to evaporation latent heat. In such conditions, the phase separation of the first layer component (a1) in the vicinity of the outer surface does not progress at the surface of the external solidification liquid, and in such a state, the first layer component (a1) advances to the inside of the external solidification liquid, and trunks in the first layer component (a1) do not grow. Therefore, in such conditions, the trunk size gradually increases from the outer surface, and the structure like the porous membrane of the present embodiment, in which trunk sizes in the vicinity of the surface are large, would not be obtainable.

The characteristics of the porous membrane of the present embodiment, namely, the structure in which the trunks in the first layer component (a1), which continues from the outer surface, are larger than trunks located toward the inside of the first layer component (a1) is achievable by making the temperature of the air-gap portion and the temperature of the surface of the external solidification liquid equal to each other. As a result, it is possible to cause trunks of the first layer component (a1) to sufficiently grow at the surface of the external solidification liquid, and that provides structure having increased strength against pressure applied from the outer surface, and which is suitable for back wash. Here, the expression "temperatures are equal" means that a difference in temperature is within 2.0 degrees.

In the method for producing the porous membrane of the present embodiment, the air-gap portion and the surface of the external solidification liquid under the air-gap portion may be controlled to the same temperature by using a method of covering the air-gap portion and a portion of the surface of the external solidification liquid under the air-gap portion by a hollow cylindrical object that can control temperature. The hollow cylindrical object may be a unitary type or a separate type, but the unitary type is more preferable, because production of such a hollow cylindrical object is easier, and control of temperature is easier.

Figure 4:
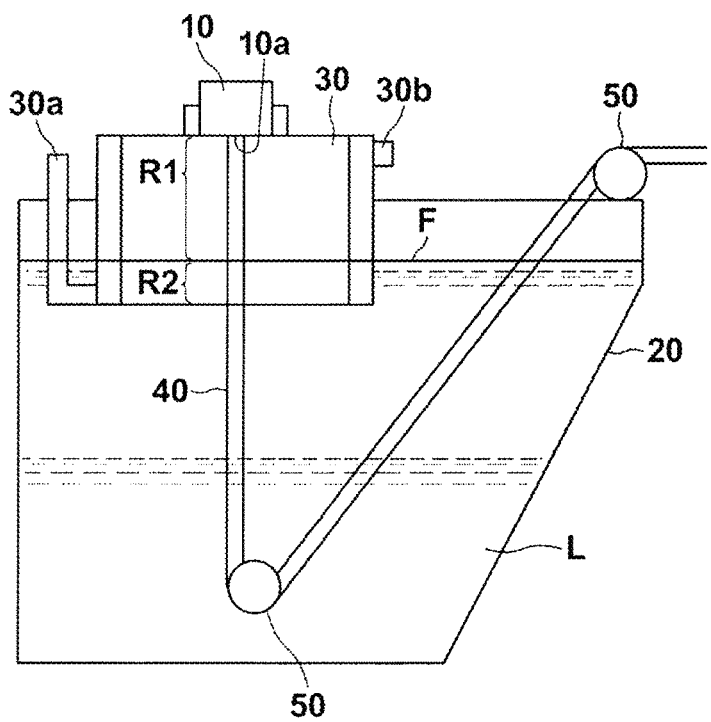
FIG. 4 A schematic diagram illustrating the configuration of an apparatus for producing a hollow fiber porous membrane FIG. 5 A diagram illustrating an example of a sample used to measure fatigue strength FIG. 6 A diagram for explaining a method for measuring fatigue strength FIG. 7 A diagram for explaining a method for measuring instantaneous membrane bursting strength

FIG. 4 is a schematic diagram illustrating the configuration of an apparatus for producing a hollow fiber porous membrane including the aforementioned hollow cylindrical object. As illustrated in FIG. 4, the apparatus for producing a hollow fiber porous membrane includes a bath 20 in which external solidification liquid L is retained, the aforementioned double tubular nozzle 10, the aforementioned hollow cylindrical object 30, and a roller 50 for winding the hollow fiber porous membrane. Section R1 illustrated in FIG. 4 is a section from the discharge hole 10a of the double tubular nozzle 10 to surface F of the external solidification liquid L, which is the aforementioned air-gap portion. Further, range R2 illustrated in FIG. 4 shows a range of external solidification liquid L including surface F. Further, FIG. 4 illustrates a hollow fiber porous membrane 40.

In the method for producing the hollow fiber porous membrane illustrated in FIG. 4, air-gap portion R1 and range R2 of external solidification liquid L including surface F are covered by the unitary hollow cylindrical object 30, and a function for controlling the temperature of air-gap portion R1 and the temperature of range R2 of external solidification liquid L including surface F simultaneously is provided. The function for controlling the temperature is provided, for example, by a method of making the hollow cylindrical object 30 in double tubular structure, and causing heating medium, such as warm water, to flow in the double tubular structure, a method of winding a heater around the hollow cylindrical object 30, and the like. The hollow cylindrical object 30 illustrated in FIG. 4 has a double tubular structure, and includes an inlet 30a of heating medium and an outlet 30b of heating medium.

The hollow cylindrical object 30 may have a circular tubular shape or a polygonal tubular shape, but preferably, the inner wall surface of the tube and the outer surface of the hollow fiber porous membrane 40 are equidistant from each other to reduce unevenness in performance. Further, one hollow cylindrical object may surround many hollow fiber porous membranes simultaneously, but in that case, preferably, partitions are provided inside the hollow cylindrical object to provide an independent space for each of the hollow fiber porous membranes so that uniform performance is achievable. Further, when the temperature of the surface of external solidification liquid L under air-gap portion R1 is controlled by the unitary hollow cylindrical object 30, the temperature of only a portion of the external solidification liquid L just under air-gap portion R1, and through which the hollow fiber porous membrane 40 passes, is controllable to a desirable temperature. Therefore, the energy cost is low and economic, compared with a case of controlling the temperature of the whole bath 20 in which external solidification liquid L is retained.

Range (R2) in which the hollow cylindrical object 30 is immersed in external solidification liquid L corresponds to a section, the temperature of which is to be equal to the temperature of air-gap portion R1. Preferably, residence time of the hollow fiber porous membrane passing through the section is set to be 0.1 second or longer and shorter than 1.0 second. As a method for controlling the residence time, a depth of immersing the hollow cylindrical object 30 in the external solidification liquid may be changed, or a speed of winding the hollow fiber porous membrane may be changed.

When the residence time of the hollow fiber porous membrane passing through section R2 is 0.1 second or longer and shorter than 1.0 second, the number of pores present in the first layer component (a1) does not increase excessively, and is appropriately controllable. When the residence time is 0.1 second or longer, the trunks of the first layer component (a1) sufficiently grow and become large, and relatively, the number of pores does not increase excessively. Further, when the residence time is shorter than 1.0 second, it is possible to prevent excessive progress of phase separation of the first layer component (a1), and thereby preventing a loss of communication characteristics, such as formation of an independent cell. When the number of pores present in the first layer component (a1) does not increase excessively, the linear speed in back wash is increased, and more effective cleaning is possible. The residence time may be calculated by the following formula:

Residence Time (sec)=$d/V$, where d (m) is a depth of immersing the hollow cylindrical object 30 in the external solidification liquid, and V (m/sec) is a speed of winding the hollow fiber membrane.

Preferably, an air-gap time is 0.1 second or longer and shorter than 10 seconds, and more preferably, 0.3 second or longer and shorter than 3 seconds. When the air-gap time is 0.1 second or longer, phase separation of the outer surface side appropriately progresses, and formation of a rejection pore diameter appropriate for filtration of suspension liquid is possible. Further, when the air-gap time is shorter than 10 seconds, it is possible to prevent stretching of a membrane that would break fibers during passage through the air-gap portion. Here, the air-gap time represents the period of time in which the membrane-forming solution passes through air after flowing out from the discharge hole 10a of the double tubular nozzle 10 until reaching surface F of external solidification liquid L.

In the method for producing the porous membrane of the present embodiment, preferably, the water vapor amount of the air-gap portion in the hollow cylindrical object 30 is 0.01 g or greater and less than 1.0 g, and more preferably, 0.1 g or greater and less than 0.8 g, and even more preferably, 0.2 g or greater and less than 0.7 g. When the amount is 0.01 g or greater, the phase separation of the outer surface progresses, and the pore diameter increases. Therefore, a drop in filtration performance caused by adsorption of substance to be removed by filtration is preventable. Further, when the water vapor amount of the air-gap portion in the hollow cylindrical object 30 is less than 1.0 g, it is possible to prevent excessive progress of phase separation, which would make obtainment of a rejection pore diameter appropriate for filtering suspension liquid impossible. Further, it is possible to prevent generation of structure defect caused by local solidification of a membrane by adhesion of condensed water vapor onto the membrane.

The water vapor amount of the air-gap portion in the hollow cylindrical object 30 is calculated from the absolute humidity inside the hollow cylindrical object 30 and the volume of the hollow cylindrical object 30. The absolute humidity inside the hollow cylindrical object 30 is measured by setting a point for inserting a probe of a hygrometer in a part of the hollow cylindrical object 30, and the probe is inserted therefrom. When the humidity is stabilized, a numerical value is read. The water vapor amount of the air-gap portion in the hollow cylindrical object 30 is represented by the following formula:

Water Vapor Amount inside Hollow Cylindrical Object (g)=Absolute Humidity inside Hollow Cylindrical Object (g/m$^3$)×Volume of Hollow Cylindrical Object (m$^3$).

Preferably, the absolute humidity of the air-gap portion in the hollow cylindrical object 30 is 300 g/m$^3$ or higher and lower than 540 g/m$^3$, and more preferably, 350 g/m$^3$ or higher and lower than 540 g/m$^3$. When the absolute humidity is in this range, a membrane that has a rejection pore diameter appropriate for filtration of suspension substance, high permeability, and high durability at the same time is obtainable.

In the method for producing a porous membrane of the present embodiment, preferably, the solution viscosity of the membrane-forming solution at a temperature when the solution flows out from the double tubular nozzle 10 is 20 Pa·s or higher and 200 Pa·s or lower, and more preferably, 30 Pa·s or higher and 150 Pa·s or lower. When the solution viscosity is 20 Pa·s or higher in production of the porous hollow fiber membrane, the membrane-forming solution that has flowed out from the outside flow path 12 of the double tubular nozzle 10 does not drop down by its own weight. Therefore, a long air-gap time is maintainable, and that is appropriate for production of the porous hollow fiber membrane having a rejection pore diameter in sub-micrometer order, which is appropriate for filtration of suspension substance. Further, when the solution viscosity is 200 Pa·s or lower, it is possible to discharge the membrane-forming solution at a constant flow rate, and a variation in the performance of membranes tends not to occur.

Further, the membrane-forming solution may include hydrophilic polymer. Examples of hydrophilic polymer are PVP, polyethylene glycol, polyvinyl alcohol, cellulose, their derivatives and the like. Among these, PVP, polyethylene glycol, and their derivatives are preferable as hydrophilic polymer, and PVP is more preferable. One or two kinds of these hydrophilic polymers may be used in mixture. When these kinds of hydrophilic polymer are used, the viscosity of the membrane-forming solution is easily controllable to provide excellent spinnability.

Further, when PVP is used as hydrophilic polymer, compatibility with hydrophobic polymer is particularly excellent. Even if the membrane-forming solution is stored for a long period of time, turbidity and segregation tend not to occur, and the membrane-forming solution having excellent storage stability is obtainable. Further, a risk of fiber breakage during spinning is reduced, because PVP is strongly intertwined with molecular chains of hydrophobic polymer. Preferably, the K value of PVP, which is an index of molecular weight, is 30 or greater and less than 120, and more preferably, 80 or greater and less than 115. When the K value is 30 or greater, PVP is strongly intertwined with molecular chains of hydrophobic polymer, and fiber breakage during spinning is suppressible. When the K value is less than 120, the PVP is easily dispersible during preparation of the membrane-forming solution, and homogeneous membrane-forming solution is easily obtainable.

When a porous membrane includes PVP, preferably, the content of PVP in the membrane-forming solution is 5 wt % or greater and 30 wt % or less with respect to the total weight of the membrane-forming solution, and more preferably, 8 wt % or greater and 15 wt % or less. When the content is in this range, it is possible to easily prepare membrane-forming solution having a viscosity in the aforementioned preferable range.

Further, the membrane-forming solution may include non-solvent for hydrophobic polymer. The non-solvent for hydrophobic polymer represents solvent in which an undissolved component is observable when 5 g of hydrophobic polymer is tried to be dissolved in the solvent of 100 g. Non-solvent for the hydrophobic polymer is water, alcohol compound, and the like. Among these, glycerin is preferable from the view point of the easiness of preparing the membrane-forming solution, formation of hydrophilic polymer distribution, a lower risk of change in composition during storage, easiness in handling, and the like. Preferably, the content of the non-solvent in the membrane-forming solution is 0.5 wt % or greater and 15 wt % or less with respect to the total weight of the membrane-formation solution, and more preferably, 1 wt % or greater and 10 wt % or less. When the content of the non-solvent is 0.5 wt % or greater, it is possible to make the membrane-forming solution close to a phase separation point in advance. Therefore, the pore diameter is easily controllable. When the content of the non-solvent is 15 wt % or less, it is possible to maintain the membrane-forming solution in a homogeneous state without segregation.

In the method for producing the hollow fiber porous membrane of the present embodiment, preferably, a part of hydrophilic polymer included in membrane-forming solution is removed by using aqueous solution including oxidizing agent simultaneously with the solidification step, or after the solidification step (preferably, after the solidification step). Here, the solidification step is a step of solidifying the membrane-forming solution in external solidification liquid after the membrane-forming solution has passed through the air-gap portion.

Examples of the aqueous solution including oxidizing agent are sodium hypochlorite aqueous solution, hydrogen peroxide aqueous solution, and the like. In such a production method, the ratio of the content of hydrophilic polymer and the content of hydrophilic polymer are within the aforementioned preferable ranges, and it is possible to obtain a porous hollow fiber membrane having more excellent filtration performance and cleaning characteristics. When the sodium hypochlorite aqueous solution is used as the aqueous solution including oxidizing agent, the aqueous solution having a concentration of 10 ppm or higher and 50000 ppm or lower may be used, but the content and distribution of the hydrophilic polymer is controllable by controlling the dissolving time and temperature based on the kind, content or the like of the used hydrophilic polymer.

When the porous membrane of the present embodiment is a flat membrane, the flat membrane is obtainable, for example, by casting the membrane-forming solution on a base material, such as nonwoven fabric impregnated with the internal solidification liquid, by using a known method, and after then, solidifying the membrane-forming solution in the external solidification liquid.

The aforementioned porous membrane may be used as a module in which many membranes are stored. Here, the porous membrane module is roughly classified into an immersing type membrane module and a pressuring type membrane module. The immersing type membrane module includes the porous membrane and an end fixing unit, which fixes at least an end of the porous membrane. The porous membrane is exposed, and may be the porous membrane of the present embodiment. The pressuring type membrane module includes a casing around the porous membrane. There are a unitary type, in which the porous membranes are fixed in the casing, and a cartridge type, in which the casing and the porous membranes are independent from each other, and the porous membranes are used by being inserted to the casing. In both types, the aforementioned porous membrane is adoptable, as the porous membrane. In filtration of fermented liquid, which should avoid contamination, the pressure type membrane module, which is usable in a closed system and easily replaceable, is preferable.

Next, a preferred embodiment of a method for producing clarified liquid according to the present disclosure will be described.

The method for producing clarified liquid according to the present embodiment includes a filtration step of filtering liquid including suspension substance by the aforementioned porous membrane. According to such a production method, it is possible to continuously obtain liquid from which the suspension substance has been sufficiently removed in a short period of time. Here, clarification means at least a part of suspension substance included in liquid before filtration has been removed.

The liquid including suspension substance should include suspension substance consisting of fine organic substance, inorganic substance, or a mixture of organic substance and inorganic substance or the like in the size of $\mu$m order or less, and use of ship ballast water and fermented liquid is particularly preferable. The fermented liquid includes beverages, such as wine and beer, foods, such as vinegar, and also various kinds of suspension liquid obtained by enzyme reaction, but the production method of the present embodiment is particularly appropriate to obtain beer fermented liquid by removing yeast from fermented liquid of beer yeast. Specifically, a method for producing beer includes at least the step of fermenting liquid including at least malt, and the step of filtering liquid in which fermented yeast is dispersed, and the porous membrane of the aforementioned embodiment is used in the filtration step. Here, the beer includes effervescent beverages produced from raw material other than barley, in addition to conventional beer, which is produced from barley and hops. The production method of the present embodiment has excellent production efficiency, and can produce sufficiently clarified beer fermented liquid with a little mixture of crushed bodies of yeast or the like.

In the method for producing clarified liquid of the present embodiment, preferably, filtration is performed by passing liquid to be treated (liquid including suspension substance) from inner surface C of the porous membrane (please refer to FIG. 1) toward outer surface A. In other words, when the porous membrane is a hollow fiber membrane, inside-out filtration is preferable. Such filtration is depth filtration, and the characteristics of the aforementioned porous membrane are sufficiently utilized. Accordingly, a high filtration speed is maintainable for a long period of time, and fracture and deformation of cells are reduced, and the membrane is easily cleanable, and filtration with high treatment efficiency is achievable.

As the filtration method, a dead end filtration or a cross flow filtration may be used, but the cross flow filtration is particularly preferable, because fouling is suppressible by shear force applied in a horizontal direction to the membrane surface.

Preferably, the speed of supplying liquid including suspension substance is a linear speed of 0.2 m/s or higher and 2.5 m/s or lower. Such a production method can reduce a risk of crush of the suspension substance and mixture of the crushed bodies into the filtrate. Further, the speed of filtration and the filtration performance become even more excellent.

Preferably, the method for producing the clarified liquid of the present embodiment further includes the step of performing back wash on the porous membrane. The back wash represents removal of sediment on the membrane surface of the porous membrane and inside the membrane by circulating liquid by application of pressure in a reverse direction to filtration. Specifically, when filtration is performed from surface C toward surface A, the back wash is performed from surface A toward surface C. The liquid used in back wash may be filtrate obtained in the filtration step, water, or warm water. Especially, when the filtration is depth filtration, remarkable recovery of performance by back wash is expectable, and it is possible to maintain the filtration performance of the porous membrane for a long period of time. Further, it is possible to maintain a sufficient filtration speed for a long period of time at low pressure and at a low liquid conveyance speed, thereby further preventing crush of suspension substance, such as yeast, included in the liquid.

Preferably, the method for producing beer also includes the aforementioned back wash step. Specifically, it is preferable that the method includes at least the step of fermenting liquid including at least malt, the first filtration step of filtering first liquid in which fermented yeast is dispersed by using the porous membrane of the present embodiment, the back wash step of causing liquid for cleaning the membrane in a reverse direction to a direction of filtering the first liquid after the first filtration step, and the second filtration step of filtering second liquid in which fermented yeast is dispersed by using the porous membrane on which the back wash step was performed.

EXAMPLES

Next, the present disclosure will be described more specifically based on examples and comparative examples, but the present disclosure is not limited to the following examples.

The properties and production conditions of porous membranes obtained in the following examples and comparative examples were measured by using the following methods.
(1) Method for Measuring Average Trunk Size
1) Cross-Section of Membrane Porous membranes obtained in examples and comparative examples were freeze-dried, and cross-sections obtained by breaking the freezed membranes were observed by an SEM. Microscopic photographs were captured by continuous observation in the membrane thickness direction at magnification that would allow recognition of pores, and a continuous photograph of a cross-section in the membrane thickness direction was obtained by connecting them. A straight line was drawn perpendicularly on the obtained continuous photograph in such a manner to go across the membrane thickness portion, and the straight line was segmented so as to equally divide the membrane thickness portion into three layers.

In each of the three equally divided layers, all the pores present on the straight line crossing the membrane thickness portion were extracted. The photograph was imported to image processing software, and trunk sizes were obtained by measuring a minimum distance between adjacent pores for each of the extracted pores. The trunk size of an outermost pore was obtained by measuring a distance between the pore and the membrane surface.

Here, when a photograph has low contrast, and pores are not easily recognizable on the image processing software, a transparent sheet may be placed on a photograph copy, and pores present on the straight line may be filled by a black pen or the like. Further, the transparent sheet may be copied on white paper. Accordingly, black pore portions and white non-pore portions become clearly distinguishable from each other.

An average trunk size was obtained for each of the three equally divided layers. The three layers are referred to as a first layer (a), a second layer (b) and a third layer (c) from the outer surface toward the inner surface of the hollow fiber membrane, and a surface continuing from the first layer (a) is referred to as surface A, and surface continuing from the third layer (c) is referred to as surface C.

A component continuing from surface A having a thickness of 10 μm in the first layer (a) was regarded as a first layer component (a1), and average trunk size S(a1) of the first layer component (a1) was calculated. After then, a profile of trunk sizes for the whole membrane thickness excluding the first layer component (a1) was checked to find whether a continuous layer component having a thickness of 10 μm and an average trunk size smaller than average trunk size S(a1) is present.

Here, when pore diameters greatly change in the membrane thickness direction, observation magnification may be changed depending on the pore diameter of each layer, as long as observation is performed along the same straight line. In the examples and comparative examples, porous membranes were observed at magnification of 5000 times for the first layer (a), and magnification of 1000 times for the second layer (b), and magnification of 500 times for the third layer (c).
2) Membrane Surface C Porous membranes obtained in the examples and comparative examples were freeze-dried, and surface C was magnified by an SEM at magnification that would allow recognition of pores. An observation range was a square in the size of membrane thickness (μm)×membrane thickness (μm) at an arbitrary position, and trunks present in the range were observed as targets. A minimum distance between adjacent pores for each pore present on surface C was obtained as a trunk size. Further, an average value of ten largest diameter trunks was obtained in the observation range.
(2) Method for Measuring Number of Pores A similar method to the aforementioned measurement of an average trunk size on a cross-section of the membrane was used, and continuous photographs of the porous membranes obtained in the examples and comparative examples were captured in the membrane thickness direction by an SEM. A perpendicular straight line going across the membrane thickness portion was equally divided into three segments in the membrane thickness direction, and the membrane thickness portion was divided into three regions of the first layer (a), the second layer (b), and the third layer (c). In the first layer (a), the second layer (b), and the third layer (c), the numbers of pores present on the straight line crossing the membrane thickness portion were counted, and the pores were extracted. Then, an average value of the numbers was obtained as the number of pores of each layer.

(3) Method for Measuring Average Pore Diameter

1) Membrane Cross-Section

A similar method to the aforementioned measurement of an average trunk size on a cross-section of the membrane was used, and continuous photographs of the porous membranes obtained in the examples and comparative examples were captured in the membrane thickness direction by an SEM. A perpendicular straight line going across the membrane thickness portion was equally divided into three segments in the membrane thickness direction, and the membrane thickness portion was divided into three regions of the first layer (a), the second layer (b), and the third layer (c). By using a similar method to the aforementioned measurement of the average trunk size, all the pores present on the straight line crossing the membrane thickness portion were extracted in each of the three equally-divided layers, and photographs were imported to image processing software. For all of the extracted pores, the diameters of corresponding circles, as pore diameters, were calculated based on areas, and an average pore diameter was calculated in each of the first layer (a), the second layer (b), and the third layer (c).

2) Membrane Surface A and C

A similar method to the aforementioned measurement of an average trunk size on membrane surface C was used, and porous membranes obtained in the examples and comparative examples were freeze-dried, and surface A and C were magnified by an SEM at magnification that would allow recognition of pores. An observation range was a square in the size of membrane thickness (μm)×membrane thickness (μm) at an arbitrary position, and pores present in the range were observed as targets. All the pores included in the observation range were extracted, and a photograph was imported to image processing software. For all of the extracted pores, the diameters of corresponding circles, as pore diameters, were calculated based on areas, and an average pore diameter was calculated for membrane surface A and C.

(4) Measurement of Inner Diameter, Outer Diameter and Ratio of Outer Diameter to Inner Diameter of Porous Membrane A porous membrane was thinly sliced in circular tube shape in a direction orthogonal to its longitudinal direction, and observed by a measurement microscope, and the inner diameter (mm) and the outer diameter (mm) of the porous membrane were measured. The ratio of the outer diameter to the inner diameter was calculated from the obtained inner diameter and outer diameter by using the following formula:

Ratio of Outer Diameter to Inner Diameter=Outer Diameter/Inner Diameter.

(5) Method for Determining Rejection Pore Diameter

At least four kinds of polystyrene latex particles in different particle diameters were used, and latex particle dispersion liquid was prepared for each of them by dispersing them in 0.5 wt % sodium dodecyl sulfate aqueous solution to get a particle concentration of 0.01 wt %. Each of the latex particle dispersion liquid was filtered by a porous membrane, and a passage rejection rate was obtained based on the ratio of a concentration before filtration to a concentration after filtration. The passage rejection rates obtained in this manner were plotted, and a particle size when the passage rejection rate was 90% was calculated, as the rejection pore diameter. Here, the particle sizes should be selected so that the four kinds of particles include at least one kind of particles having a passage rejection rate of 50% or lower and at least one kind of particles having a passage rejection rate of 90% or higher.

(6) Method for Measuring Porosity

A membrane bundle of porous membranes was cut into a length of about 5 cm, and sufficiently dried at 120° C. until the weight became constant. The weight was obtained as the weight of the dry membrane. This fiber bundle was immersed in liquid, such as ethanol, which has low surface tension, and micropores were hydrophilized. After then, the fiber bundle was sufficiently washed with water, and ethanol was completely substituted with water. After then, excessive water adhered to the surface of the membrane was removed, and the weight of the membrane was measured, as the weight of a wet membrane. The weight of water soaked into the micropores was obtained based on a difference between the weight of the wet membrane and the weight of the dry membrane. A porosity was calculated from a volume obtained from the size of the porous membrane and the volume of water soaked into the micropores by using the following formula:

Porosity (%)=Volume of Water Soaked into Micropores/Volume of Membrane×100.

(7) Measurement of Content Ratio of PVP

1H-NMR measurement of the porous membrane was performed under the following conditions, and the content ratio of PVP was calculated from an obtained spectrum by using the following method.

[Measurement Conditions]

Apparatus: JNM-LA400 (JEOL Ltd.)
Resonance Frequency: 400.05 MHz
Solvent: Deuterated DMF
Sample Concentration: 5 wt %
Number of Scans: 256

(In the Case of Polysulfone Membrane)

Calculation was performed based on the integral value ($I_{PVP}$) of a signal derived from PVP (for 4H) appearing in the vicinity of 1.85 to 2.5 ppm and the integral value ($I_{PSf}$) of a signal derived from polysulfone (for 4H) appearing in the vicinity of 7.3 ppm by using the following formula:

PVP Content Ratio (wt %)=111($I_{PVP}$/4)/{442($I_{PSf}$/4)+111($I_{PVP}$/4)}×100.

(In the Case of Polyethersulfone Membrane)

Calculation was performed based on the integral value ($I_{PVP}$) of a signal derived from polyvinyl pyrrolidone (for 4H) appearing in the vicinity of 1.85 to 2.5 ppm and the integral value ($I_{PES}$) of a signal derived from polyethersulfone (for 4H) appearing in the vicinity of 8 ppm by using the following formula:

PVP Content Ratio (wt %)=111($I_{PVP}$/4)/{232($I_{PES}$/4)+111($I_{PVP}$/4)}×100.

(8) Measurement of Viscosity of Membrane-Forming Solution

Membrane-forming solution stored in a wide-mouth bottle was placed in a thermostatic bath, and a liquid temperature was set to the temperature of the liquid at the time of discharge from the double tubular nozzle. Then, a viscosity was measured using a B-type viscometer.

(9) Measurement of Fatigue Strength (in the Case of Hollow Fiber Membrane)

Figure 5:
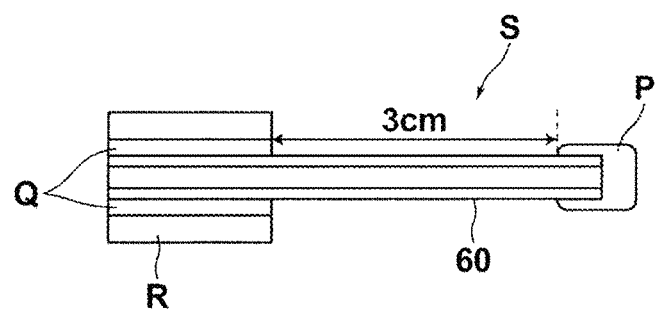
Figure 6:
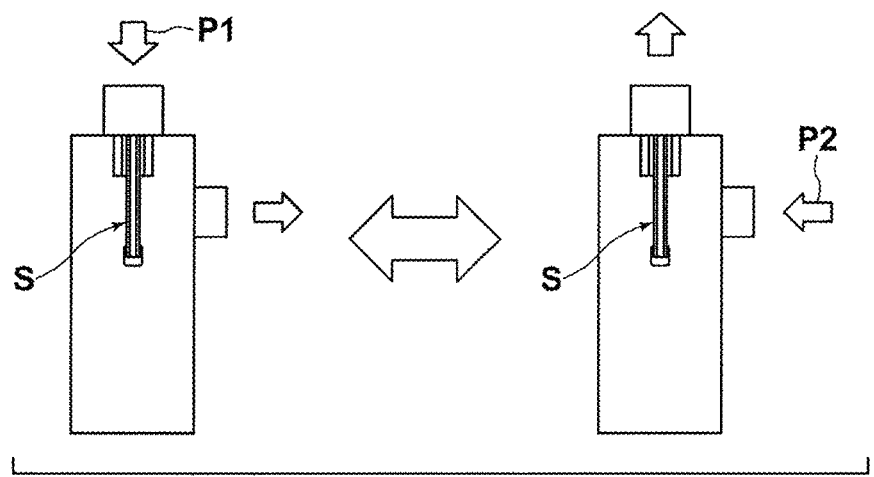

A hollow fiber membrane cut into a length of about 7 cm was dried by a dryer at 70° C. until the weight became constant. As illustrated in FIG. 5, an end of this membrane was sealed with adhesive P, and the other end was fixed to a connection jig R with adhesive Q with the hollow portion open. Accordingly, sample S having a shape that allows application of pressure to the hollow portion was prepared. At this time, an exposed portion (effective length) between adhered portions was adjusted to 3 cm. The effective length portion of the sample was immersed in 40 wt % ethanol aqueous solution for 30 minutes, and after then, ethanol was substituted with water by sufficiently washing the membrane with water, and thereby air in the porous material was removed. As illustrated in FIG. 6, sample S was attached to an apparatus that can alternately change pressure application directions (change to the direction of arrow P1 (during filtration) and the direction of arrow P2 (during back wash) as illustrated in FIG. 6). Water pressure was repeatedly applied in the following conditions, and the number of times of repetition before the membrane was fractured due to fatigue was measured.

Conditions

Pressure (A) During filtration (inside-out in the case of hollow fiber membrane): 0.3 MPa (B) During back wash (outside-in in the case of hollow fiber membrane): 0.2 MPa Time (A) During filtration: 25 seconds (B) During back wash: 5 seconds Temperature

25±5° C.

Method for Evaluating Result

Results were evaluated in the following manner: an excellent level (E) if pressure was applicable 30000 times or more without fracture of a membrane, a good level (G) if pressure was applicable 15000 times or more and less than 30000 times, a fair level (F), which means practically applicable, if pressure was applicable 10000 times or more and less than 15000 times, and a poor level (P), which means practically problematic, if pressure was not applicable 10000 times or more.

(10) Measurement of Instantaneous Bursting Strength (in the Case of Hollow Fiber Membrane)

Figure 7:
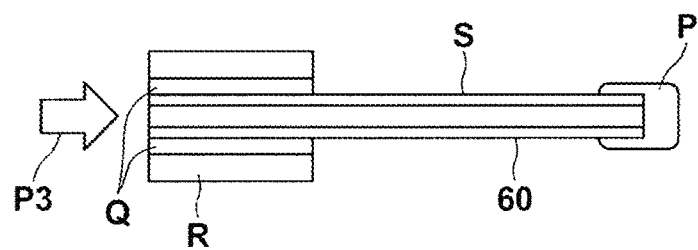

In a similar manner to the method for measuring a fatigue strength, as illustrated in FIG. 5, an end of a hollow fiber membrane cut into a length of about 7 cm was sealed with adhesive P, and the other end of the membrane was fixed to a connection jig R with adhesive Q with the hollow portion open. Accordingly, sample S having a shape that allows application of pressure to the hollow portion was prepared. As illustrated in FIG. 7, this was set so that pressure is applicable to the hollow portion in the direction of arrow P3, and pressure was increased at a rate of 0.02 MPa/sec, and pressure when the membrane fractured was measured.

Results were evaluated in the following manner: an excellent level (E) if an instantaneous membrane bursting strength was 1.5 MPa or higher, a good level (G) if the strength was 1.0 MPa or higher and 1.4 MPa or lower, a fair level (F), which means practically applicable, if the strength was 0.6 MPa or higher and 1.0 MPa or lower, and a poor level (P), which means practically problematic level, if the strength was lower than 0.6 MPa.

(11) Measurement of Pure Water Permeability (in the Case of Hollow Fiber Membrane Module)

Porous membranes obtained in the examples and comparative examples were used, and a module of eight membranes with an effective length of 70 cm was prepared. Inside-out filtration was performed with pure water at 25° C. and filtration pressure of 15 kPa, and the amount of liquid passing in 1 minute was measured. The value was converted into a value for a unit membrane area for one hour, and at 100 kPa to get pure water permeability.

(12) Measurement of Beer Permeability

The aforementioned module was used, and commercially available unfiltered beer (August Beer Original (manufactured by August Beer Corporation)) was filtered under the following conditions.

Conditions

Circulation Linear Speed at Entrance to Module: 0.9 m/s

Filtration Amount: 100 L/m$^2$/h (constant flow rate filtration)

Temperature: 10±5° C.

Beer Properties

Yeast Concentration: $10^4$ cells/ml

Turbidity: 60 NTU

An end of filtration was judged when TMP (transmembrane pressure) reached 0.1 MPa. Here, TMP is represented by the following formula:

$$TMP\ (MPa) = \{Module\ Entrance\ Pressure\ (MPa) + Module\ Exit\ Pressure\ (MPa)\}/2 - Module\ Back\ Pressure\ (MPa).$$

Method for Evaluating Filtration Performance

Beer Permeability: Filtration performance was evaluated by measuring cumulative filtration volume of beer filtered (beer permeability) before TMP reached 0.1 MPa. Specifically, filtration was evaluated by judging that the performance is higher as the cumulative filtration volume of beer is larger. Specifically, filtration performance was evaluated in the following manner: a good level (G) if the cumulative filtration volume was 500 L/m$^2$/h or higher, a fair level (F), which means practically applicable, if the cumulative filtration volume was 100 L/m$^2$/h or higher and lower than 500 L/m$^2$/h, and a poor level (P), which means practically problematic, if the cumulative filtration volume was lower than 100 L/m$^2$/h.

Yeast Concentration of Filtrate: to be 0

Turbidity of Filtrate: to be 3 to 20 NTU

(13) Measurement of Water Permeability Maintenance Rate after Filtration

Pure water permeability was measured again in the aforementioned module after filtering unfiltered beer by using a similar method to measurement of the pure water permeability in (11), and a water permeability maintenance rate after filtration was calculated:

$$Water\ Permeability\ Maintenance\ Rate\ (\%)\ after\ Filtration = Pure\ Water\ Permeability\ after\ Filtration/Initial\ Pure\ Water\ Permeability \times 100.$$

(14) Measurement of Water Permeability Maintenance Rate by Back Wash

After measuring the water permeability maintenance rate after filtration, back wash was performed under the following conditions.

Conditions

Used Liquid: Pure Water at 25° C.

Back Wash Pressure: 30 kPa

Time: 5 minutes

After the back wash, the pure water permeability was measured again, and water permeability maintenance rate by back wash was obtained by the following formula:

Water Permeability Maintenance Rate (%) by Back Wash=Pure Water Permeability after Back Wash/Initial Pure Water Permeability×100.

The water permeability maintenance rate was evaluated in the following manner: a good level (G) if the rate was 90% or higher, a fair level (F), which means practically applicable, if the rate was 70% or higher and lower than 90%, and a poor level (P), which means practically problematic, if the rate was lower than 70%.

If this water permeability maintenance rate after back wash is secured, achievement of sufficient filtration performance is recognizable also in the second filtration step after the back wash step in the method for producing beer of the present disclosure.

Table 1 shows production conditions of hollow fiber membranes of Examples 1 to 9, and Table 2 shows properties of the obtained hollow fiber membranes, and Table 3 shows evaluation results of the obtained hollow fiber membranes. Further, Table 4 shows production conditions of hollow fiber membranes of Examples 10 to 18, and Table 5 shows properties of the obtained hollow fiber membranes, and Table 6 shows evaluation results of the obtained hollow fiber membranes.

Example 1

20 wt % polysulfone (Udel P3500 manufactured by SOLVAY ADVANCED POLYMERS LLC) and 10 wt % PVP (Luvitec k90 manufactured by BASF Corporation) were dissolved in 64.5 wt % NMP at 70° C. by stirring, and 5.5 wt % glycerin was added and stirred to prepare membrane-forming solution. Meanwhile, mixture solution of 90 wt % NMP and 10 wt % pure water was prepared as internal solidification liquid. The temperature of the membrane-forming solution was controlled to 61° C., and the membrane-forming solution was discharged from an outside path of the double tubular nozzle and the internal solidification liquid was discharged from the inside path of the double tubular nozzle simultaneously. Then, after the membrane-forming solution passed through an air-gap portion for 0.5 second, the membrane-forming solution was solidified by the external solidification liquid, and wound up at a spinning rate of 10.5 m/min. In this manner, a hollow fiber porous membrane was prepared. Pure water was used as the external solidification liquid, and the temperature of a bath keeping the external solidification liquid was controlled to 84° C. At this time, the air-gap portion, through which the membrane passes, and the external solidification liquid under the air-gap portion were covered by a unitary hollow cylindrical object that can control temperature, and the temperature of the air-gap portion was controlled to about 90° C.

At this time, the hollow cylindrical object was immersed in the external solidification liquid to a depth of 5 cm, and the residence time of the hollow fiber membrane for this period was 0.29 second. Further, the actually measured temperature of the air-gap portion and the actually measured temperature of the external solidification liquid covered by the hollow cylindrical object were 90.1° C. and 89.2° C. respectively, and it was confirmed that the temperatures were equal to each other.

The hollow cylindrical object in circular tubular shape with a diameter of 113 mm was used, and the length of the air-gap portion was 85 mm. At this time, the volume of the inner space of the hollow cylindrical object was 852 cm³, and a water vapor amount was 0.37 g, and an absolute humidity was 431 g/m³.

Then, after solvent was removed from the porous membrane in water, PVP was decomposed in sodium hypochlorite aqueous solution having free available chlorine concentration of 100 ppm at 50° C. for 1.5 hours, and then, washed with hot water at 90° C. for 1.5 hours. Accordingly, a porous hollow fiber membrane was obtained. The obtained hollow fiber membrane had an inner diameter of 1.55 mm, an outer diameter of 2.48 mm, and the ratio of the outer diameter to the inner diameter was 1.60.

The obtained membrane had a high repetitive fatigue strength, and beer filtration performance was good and permeation recovery characteristics by back wash were also good.

Example 2

A hollow fiber membrane was prepared by using a similar method to Example 1, except that the composition of the membrane-forming solution was changed to 22 wt % polysulfone, 10 wt % PVP (Luvitec k90 manufactured by BASF Corporation), 62.5 wt % NMP, and 5.5 wt % glycerin.

In the obtained membrane, a repetitive fatigue strength was further improved. However, the beer filtration characteristics had slightly lower permeability. Further, water permeation recovery characteristics by back wash were good.

Example 3

A hollow fiber membrane was prepared by using a similar method to Example 1, except that the composition of the membrane-forming solution was changed to 18 wt % polysulfone, 15 wt % PVP (Luvitec k80 manufactured by BASF Corporation), 62 wt % NMP, and 5.0 wt % glycerin, and the temperature of the air-gap portion in the hollow cylindrical object was controlled to about 75° C.

In the obtained membrane, a repetitive fatigue strength was slightly lower, but the degree was not problematic for use. Beer filtration characteristics and water permeation recovery characteristics by back wash were good.

Example 4

A hollow fiber membrane was prepared by using a similar method to Example 1, except that the depth of immersing the hollow cylindrical object in the external solidification liquid was 2 cm. At this time, the residence time of the hollow fiber membrane covered by the hollow cylindrical object in the external solidification liquid was 0.11 second.

In the obtained membrane, a repetitive fatigue strength, and beer filtration characteristics were good. Water permeation recovery characteristics by back wash became slightly lower, but the degree was not problematic for use.

Example 5

A hollow fiber membrane was prepared by using a similar method to Example 1, except that the depth of immersing the hollow cylindrical object in the external solidification liquid was 15 cm. At this time, the residence time of the hollow fiber membrane covered by the hollow cylindrical object in the external solidification liquid was 0.86 second.

In the obtained membrane, a repetitive fatigue strength, and beer filtration characteristics were good. Water permeation recovery characteristics by back wash became slightly lower, but the degree was not problematic for use.

Example 6

A hollow fiber membrane was prepared by using a similar method to Example 1, except that the depth of immersing the hollow cylindrical object in the external solidification liquid was 5 cm. At this time, the residence time of the hollow fiber membrane covered by the hollow cylindrical object in the external solidification liquid was 0.03 second.

In the membrane obtained in Example 6, no layer component having a thickness of 10 μm and the number of pores larger than the number of pores present in the first layer component (a1) was present in the first layer (a) to the third layer (c) other than first layer component (a1).

In the obtained membrane, a repetitive fatigue strength, and beer filtration characteristics were good. However, water permeation recovery characteristics by back wash became lower.

Example 7

A hollow fiber membrane was prepared by using a similar method to Example 1, except that the temperature of the air-gap portion in the unitary hollow cylindrical object was controlled to about 55° C. At this time, the actually measured temperature of the air-gap portion and the actually measured temperature of the external solidification liquid covered by the hollow cylindrical object were 55.0° C. and 54.8° C. respectively, and it was confirmed that the temperatures were equal to each other. The relative humidity of the air-gap portion was controlled to 100%. The water vapor amount of the inner space of the hollow cylindrical object was 0.089 g, and an absolute humidity was 104 g/m$^3$.

In the obtained membrane, a repetitive fatigue strength, beer filtration characteristics, and water permeation recovery characteristics by back wash were good.

Example 8

A hollow fiber membrane was prepared by using a similar method to Example 1, except that a hollow cylindrical object in circular tubular shape having a diameter of 185 mm was used as the unitary hollow cylindrical object. At this time, the volume of the inner space of the hollow cylindrical object was 2284 cm$^3$ and the water vapor amount was 0.98 g.

In the obtained membrane, a repetitive fatigue strength was good. Beer filtration characteristics had improved permeability, but a raise in the turbidity of filtrate was observed. Water permeation recovery characteristics by back wash became slightly lower.

Example 9

A hollow fiber membrane was prepared by using in circular tubular shape object in circular tubular shape having a diameter of 30 mm was used as the unitary hollow cylindrical object. At this time, the volume of the inner space of the hollow cylindrical object was 18 cm$^3$ and the water vapor amount was 0.0075 g.

In the obtained membrane, a repetitive fatigue strength was good. Beer filtration characteristics had slightly lower permeability. Water permeation recovery characteristics by back wash was good.

Example 10

A hollow fiber membrane was prepared by using a similar method to Example 1, except that a hollow cylindrical object in circular tubular shape having a diameter of 200 mm was used as the unitary hollow cylindrical object. At this time, the volume of the inner space of the hollow cylindrical object was 2669 cm$^3$ and the water vapor amount was 1.2 g.

During formation of the membrane, condensation occurred on the membrane due to the water vapor in the air-gap portion, and inhomogeneous structure partially including small diameters was induced.

In the obtained membrane, a repetitive fatigue strength was good. Beer filtration characteristics had improved permeability, but a raise in the turbidity of filtrate was observed. Water permeation recovery characteristics by back wash became lower.

Example 11

A hollow fiber membrane was prepared by using a similar method to Example 1, except that the composition of the internal solidification liquid was changed to a mixed solution of 75 wt % NMP and 25 wt % pure water.

In the obtained membrane, a repetitive fatigue strength was good. Beer filtration characteristics had slightly lower permeability, but the degree was not problematic for use. Water permeation recovery characteristics by back wash were good.

Example 12

A hollow fiber membrane was prepared by using a similar method to Example 1, except that the composition of the internal solidification liquid was changed to a mixed solution of 98 wt % NMP and 2 wt % pure water.

In the obtained membrane, a repetitive fatigue strength was high, and beer filtration characteristics were good. Further, water permeation recovery characteristics by back wash were also good.

Example 13

A hollow fiber membrane was prepared by using a similar method to Example 1, except that the composition of the internal solidification liquid was changed to a mixed solution of 65 wt % NMP and 35 wt % pure water.

In the obtained membrane, a repetitive fatigue strength was good. Beer filtration characteristics had lower permeability. Water permeation recovery characteristics by back wash became slightly lower.

Example 14

A hollow fiber membrane was prepared by using a similar method to Example 1, except that the composition of the internal solidification liquid was changed to a mixed solution of 50 wt % NMP and 50 wt % pure water.

In the obtained membrane, a repetitive fatigue strength was good. Beer filtration characteristics had remarkably lower permeability. Water permeation recovery characteristics by back wash were good.

Example 15

A hollow fiber membrane was prepared by using a similar method to Example 1, except that a discharge amount of the membrane-forming solution was controlled to increase the outer diameter. The obtained hollow fiber membrane had an inner diameter of 1.55 mm, an outer diameter 3.50 mm, and the ratio of the outer diameter to the inner diameter was 2.26.

In the obtained membrane, a repetitive fatigue strength was further improved, but beer filtration characteristics had lower permeability. Water permeation recovery characteristics by back wash were good.

Example 16

A hollow fiber membrane was prepared by using a similar method to Example 1, except that the composition of the membrane-forming solution was changed to 20 wt % polysulfone, 15 wt % PVP (Luvitec k30 manufactured by BASF Corporation), 62 wt % NMP, and 5.0 wt % glycerin.

In the obtained membrane, a repetitive fatigue strength became lower, but the degree was not problematic for use. Further, beer filtration characteristics had slightly lower permeability, but the degree was not problematic for use. Water permeation recovery characteristics by back wash were good.

Example 17

A hollow fiber membrane was prepared by using a similar method to Example 1, except that the composition of the membrane-forming solution was changed to 20 wt % polyethersulfone, 10 wt % PVP (Luvitec k90 manufactured by BASF Corporation), 64.5 wt % NMP, and 5.5 wt % glycerin, and the composition of the internal solidification liquid was changed to a mixed solution of 75 wt % NMP and 25 wt % pure water.

In the obtained membrane, a repetitive fatigue strength was good. Beer filtration characteristics had slightly lower permeability, but the degree was not problematic for use. Water permeation recovery characteristics by back wash were slightly lower.

Example 18

A hollow fiber membrane was prepared by using a similar method to Example 1, except that the composition of the membrane-forming solution was changed to 20 wt % polysulfone, 15 wt % polyethylene glycol (POLYGLYKOL 35000 S manufactured by Clariant Corporation), 62 wt % NMP, and 5.0 wt % glycerin.

In the obtained membrane, a repetitive fatigue strength was lower, but the degree was not problematic for use. Beer filtration characteristics had lower permeability. Water permeation recovery characteristics by back wash were low, because substance to be removed by filtration was adsorbed on the membrane as PVP was not included.

Example 19

A hollow fiber membrane was prepared by using a similar method to Example 1, except that the composition of the membrane-forming solution was changed to 18 wt % polyvinylidene fluoride (Kynar741 manufactured by Arkema Co., Ltd.), 14 wt % PVP (Luvitec k90 manufactured by BASF Corporation), 65 wt % dimethylacetamide, and 3 wt % glycerin, and a mixed solution of 90 wt % dimethylacetamide and 10 wt % pure water was used as internal solidification liquid.

In the obtained membrane, a repetitive fatigue strength was high, and beer filtration characteristics were good. However, water permeation recovery characteristics by back wash were slightly lower.

TABLE 1

| | | EXAMPLE 1 | EXAMPLE 2 | EXAMPLE 3 | EXAMPLE 4 | EXAMPLE 5 |
|---|---|---|---|---|---|---|
| MEMBRANE-FORMING SOLUTION COMPONENT | HYDROPHOBIC POLYMER | POLYSULFONE | POLYSULFONE | POLYSULFONE | POLYSULFONE | POLYSULFONE |
| | SOLVENT | NMP | NMP | NMP | NMP | NMP |
| | HYDROPHILIC POLYMER | PVP k90 | PVP k90 | PVP k80 | PVP k90 | PVP k90 |
| | NON-SOLVENT | GLYCERIN | GLYCERIN | GLYCERIN | GLYCERIN | GLYCERIN |
| MEMBRANE-FORMING SOLUTION COMPOSITION (wt %) | HYDROPHOBIC POLYMER | 20 | 22 | 18 | 20 | 20 |
| | SOLVENT | 64.5 | 62.5 | 62 | 64.5 | 64.5 |
| | HYDROPHILIC POLYMER | 10 | 10 | 15 | 10 | 10 |
| | NON-SOLVENT | 5.5 | 5.5 | 5 | 5.5 | 5.5 |
| INTERNAL SOLIDIFICATION LIQUID COMPOSITION | | NMP 90 wt % AQUEOUS SOLUTION | NMP 90 wt % AQUEOUS SOLUTION | NMP 90 wt % AQUEOUS SOLUTION | NMP 90 wt % AQUEOUS SOLUTION | NMP 90 wt % AQUEOUS SOLUTION |
| EXTERNAL SOLIDIFICATION LIQUID COMPOSITION | | PURE WATER | PURE WATER | PURE WATER | PURE WATER | PURE WATER |
| AIR-GAP TIME(s) | | 0.49 | 0.49 | 0.49 | 0.49 | 0.49 |
| WINDING SPEED (m/min) | | 10.5 | 10.5 | 10.5 | 10.5 | 10.5 |
| PRESENCE OF HOLLOW CYLINDRICAL OBJECT | | YES | YES | YES | YES | YES |
| IMMERSION DEPTH OF HOLLOW CYLINDRICAL OBJECT IN EXTERNAL SOLIDIFICATION LIQUID(mm) | | 50 | 50 | 50 | 20 | 150 |
| RETENTION TIME IN SECTION OF EXTERNAL SOLIDIFICATION LIQUID HAVING SAME TEMPERATURE AS AIR-GAP PORTION(s) | | 0.29 | 0.29 | 0.29 | 0.11 | 0.86 |

TABLE 1-continued

| | | | | | |
|---|---|---|---|---|---|
| TEMPERATURE OF AIR-GAP PORTION COVERED BY HOLLOW CYLINDRICAL OBJECT(° C.) | 90.1 | 90.2 | 74.9 | 89.8 | 89.9 |
| RELATIVE HUMIDITY OF AIR-GAP PORTION COVERED BY HOLLOW CYLINDRICAL OBJECT(%) | 100 | 100 | 100 | 100 | 100 |
| ABSOLUTE HUMIDITY OF AIR-GAP PORTION IN HOLLOW CYLINDRICAL OBJECT(g/m3) | 431 | 432 | 243 | 426 | 428 |
| TEMPERATURE OF EXTERNAL SOLIDIFICATION LIQUID COVERED BY HOLLOW CYLINDRICAL OBJECT (° C.) | 89.2 | 88.4 | 74.3 | 88.4 | 89.2 |
| DIFFERENCE IN TEMPERATURE BETWEEN AIR-GAP PORTION AND EXTERNAL SOLIDIFICATION LIQUID COVERED BY HOLLOW CYLINDRICAL OBJECT(° C.) | 0.9 | 1.8 | 0.6 | 1.4 | 0.7 |
| WATER VAPOR AMOUNT OF AIR-GAP PORTION IN HOLLOW CYLINDRICAL OBJECT(g) | 0.37 | 0.37 | 0.07 | 0.36 | 0.36 |

| | | | EXAMPLE 6 | EXAMPLE 7 | EXAMPLE 8 | EXAMPLE 9 |
|---|---|---|---|---|---|---|
| MEMBRANE-FORMING SOLUTION COMPONENT | HYDROPHOBIC POLYMER | | POLYSULFONE | POLYSULFONE | POLYSULFONE | POLYSULFONE |
| | SOLVENT | | NMP | NMP | NMP | NMP |
| | HYDROPHILIC POLYMER | | PVP k90 | PVP k90 | PVP k90 | PVP k90 |
| | NON-SOLVENT | | GLYCERIN | GLYCERIN | GLYCERIN | GLYCERIN |
| MEMBRANE-FORMING SOLUTION COMPOSITION (wt %) | HYDROPHOBIC POLYMER | | 20 | 20 | 20 | 20 |
| | SOLVENT | | 64.5 | 64.5 | 64.5 | 64.5 |
| | HYDROPHILIC POLYMER | | 10 | 10 | 10 | 10 |
| | NON-SOLVENT | | 5.5 | 5.5 | 5.5 | 5.5 |
| INTERNAL SOLIDIFICATION LIQUID COMPOSITION | | | NMP 90 wt % AQUEOUS SOLUTION | NMP 90 wt % AQUEOUS SOLUTION | NMP 90 wt % AQUEOUS SOLUTION | NMP 90 wt % AQUEOUS SOLUTION |
| EXTERNAL SOLIDIFICATION LIQUID COMPOSITION | | | PURE WATER | PURE WATER | PURE WATER | PURE WATER |
| AIR-GAP TIME(s) | | | 0.49 | 0.49 | 0.49 | 0.14 |
| WINDING SPEED (m/min) | | | 10.5 | 10.5 | 10.5 | 10.5 |
| PRESENCE OF HOLLOW CYLINDRICAL OBJECT | | | YES | YES | YES | YES |
| IMMERSION DEPTH OF HOLLOW CYLINDRICAL OBJECT IN EXTERNAL SOLIDIFICATION LIQUID(mm) | | | 5 | 50 | 50 | 50 |
| RETENTION TIME IN SECTION OF EXTERNAL SOLIDIFICATION LIQUID HAVING SAME TEMPERATURE AS AIR-GAP PORTION(s) | | | 0.03 | 0.29 | 0.29 | 029 |
| TEMPERATURE OF AIR-GAP PORTION COVERED BY HOLLOW CYLINDRICAL OBJECT(° C.) | | | 90.1 | 55.0 | 90.0 | 89.8 |
| RELATIVE HUMIDITY OF AIR-GAP PORTION COVERED BY HOLLOW CYLINDRICAL OBJECT(%) | | | 100 | 100 | 100 | 100 |
| ABSOLUTE HUMIDITY OF AIR-GAP PORTION IN HOLLOW CYLINDRICAL OBJECT(g/m3) | | | 431 | 104 | 429 | 426 |
| TEMPERATURE OF EXTERNAL SOLIDIFICATION LIQUID COVERED BY HOLLOW CYLINDRICAL OBJECT (° C.) | | | 89.5 | 54.8 | 89.3 | 88.8 |
| DIFFERENCE IN TEMPERATURE BETWEEN AIR-GAP PORTION AND EXTERNAL SOLIDIFICATION LIQUID COVERED BY HOLLOW CYLINDRICAL OBJECT(° C.) | | | 0.6 | 0.2 | 0.7 | 1.0 |
| WATER VAPOR AMOUNT OF AIR-GAP PORTION IN HOLLOW CYLINDRICAL OBJECT(g) | | | 0.37 | 0.089 | 0.98 | 0.0075 |

TABLE 2

| | | EXAMPLE 1 | EXAMPLE 2 | EXAMPLE 3 | EXAMPLE 4 | EXAMPLE 5 |
|---|---|---|---|---|---|---|
| AVERAGE TRUNK SIZE($\mu$m) | SECOND LAYER(b) | 1.9 | 2.3 | 1.7 | 2.0 | 1.6 |
| | THIRD LAYER(c) | 4.8 | 10.6 | 4.1 | 5.1 | 4.9 |
| RATIO OF AVERAGE TRUNK SIZES | THIRD LAYER(c)/ SECOND LAYER(b) | 2.5 | 4.6 | 2.4 | 2.6 | 3.1 |
| AVERAGE TRUNK SIZE S(a1) OF FIRST LAYER COMPONENT (a1)($\mu$m) | | 0.82 | 0.78 | 1.1 | 0.52 | 1.2 |
| PRESENCE OF LAYER HAVING AVERAGE TRUNK SIZE SMALLER THAN S(a1) | | YES | YES | YES | YES | YES |
| AVERAGE TRUNK SIZE OF LAYER HAVING SMALLER AVERAGE TRUNK SIZE OF S(a1)($\mu$m) | | 0.60 | 0.69 | 0.80 | 0.34 | 0.73 |
| AVERAGE VALUE OF TEN LARGEST DIAMETER TRUNKS ON INNER SURFACE(SURFACE C)($\mu$m) | | 59.6 | 74.5 | 32.6 | 53.9 | 63.5 |
| NUMBER OF PORES (IN NUMBER) | FIRST LAYER(a) | 124 | 75 | 153 | 121 | 130 |
| | SECOND LAYER(b) | 45 | 30 | 43 | 43 | 50 |
| | THIRD LAYER(c) | 17 | 8 | 18 | 14 | 18 |
| DISTRIBUTION OF NUMBERS OF PORES | | (a) > (b) > (c) | (a) > (b) > (c) | (a) > (b) > (c) | (a) > (b) > (c) | (a) > (b) > (c) |
| NUMBER OF PORES PRESENT IN FIRST LAYER COMPONENT(a1)(IN NUMBER) | | 10 | 15 | 7 | 18 | 5 |
| PRESENCE OF LAYER HAVING NUMBER OF PORES LARGER THAN FIRST LAYER COMPONENT(a1) | | YES | YES | YES | YES | YES |
| PORE DIAMETER ON OUTER SURFACE(SURFACE A)($\mu$m) | | 5.0 | 3.6 | 2.5 | 4.8 | 5.3 |
| AVERAGE PORE DIAMETER ($\mu$m) | FIRST LAYER(a) | 0.85 | 0.54 | 0.52 | 0.87 | 0.83 |
| | SECOND LAYER(b) | 2.4 | 2.0 | 2.0 | 2.4 | 2.8 |
| | THIRD LAYER(c) | 6.4 | 7.3 | 5.6 | 7.0 | 6.8 |
| DISTRIBUTION OF AVERAGE PORE DIAMETER($\mu$m) | | (a) < (b) < (c) | (a) < (b) < (c) | (a) < (b) < (c) | (a) < (b) < (c) | (a) < (b) < (c) |
| RATIO OF AVERAGE PORE DIAMETERS($\mu$m) | THIRD LAYER(c)/ FIRST LAYER(a) | 7.5 | 13.5 | 10.8 | 8.0 | 8.2 |
| INNER DIAMETER(mm) | | 1.55 | 1.54 | 1.4 | 1.55 | 1.55 |
| OUTER DIAMETER(mm) | | 2.48 | 2.47 | 2.3 | 2.48 | 2.48 |
| AVERAGE MEMBRANE THICKNESS(mm) | | 0.465 | 0.465 | 0.45 | 0.465 | 0.465 |
| RATIO OF OUTER DIAMETER TO INNER DIAMETER | | 1.60 | 1.60 | 1.64 | 1.60 | 1.60 |
| REJECTION PORE DIAMETER($\mu$m) | | 0.6 | 0.6 | 0.4 | 0.6 | 0.6 |
| POROSITY(%) | | 80 | 78 | 78 | 80 | 80 |
| POLYVINYL PYRROLIDONE CONTENT(mass %) | | 0.6 | 0.4 | 1.0 | 0.7 | 0.6 |

| | | EXAMPLE 6 | EXAMPLE 7 | EXAMPLE 8 | EXAMPLE 9 |
|---|---|---|---|---|---|
| AVERAGE TRUNK SIZE($\mu$m) | SECOND LAYER(b) | 1.8 | 1.7 | 2.1 | 1.4 |
| | THIRD LAYER(c) | 4.6 | 4.4 | 5.0 | 4.3 |
| RATIO OF AVERAGE TRUNK SIZES | THIRD LAYER(c)/ SECOND LAYER(b) | 2.6 | 2.6 | 2.4 | 3.1 |
| AVERAGE TRUNK SIZE S(a1) OF FIRST LAYER COMPONENT (a1)($\mu$m) | | 0.34 | 0.78 | 0.76 | 0.78 |
| PRESENCE OF LAYER HAVING AVERAGE TRUNK SIZE SMALLER THAN S(a1) | | YES | YES | YES | YES |
| AVERAGE TRUNK SIZE OF LAYER HAVING SMALLER AVERAGE TRUNK SIZE OF S(a1)($\mu$m) | | 0.30 | 0.57 | 0.61 | 0.60 |
| AVERAGE VALUE OF TEN LARGEST DIAMETER TRUNKS ON INNER SURFACE(SURFACE C)($\mu$m) | | 62.9 | 69.3 | 72.3 | 61.5 |
| NUMBER OF PORES (IN NUMBER) | FIRST LAYER(a) | 128 | 135 | 118 | 113 |
| | SECOND LAYER(b) | 47 | 55 | 40 | 47 |
| | THIRD LAYER(c) | 15 | 20 | 16 | 18 |
| DISTRIBUTION OF NUMBERS OF PORES | | (a) > (b) > (c) | (a) > (b) > (c) | (a) > (b) > (c) | (a) > (b) > (c) |
| NUMBER OF PORES PRESENT IN FIRST LAYER COMPONENT(a1)(IN NUMBER) | | 20 | 9 | 12 | 10 |
| PRESENCE OF LAYER HAVING NUMBER OF PORES LARGER THAN FIRST LAYER COMPONENT(a1) | | NO | YES | YES | YES |
| PORE DIAMETER ON OUTER SURFACE(SURFACE A)($\mu$m) | | 5.1 | 1.2 | 17.4 | 0.5 |
| AVERAGE PORE DIAMETER ($\mu$m) | FIRST LAYER(a) | 0.91 | 0.61 | 1.3 | 0.33 |
| | SECOND LAYER(b) | 2.5 | 1.5 | 3.5 | 1.2 |
| | THIRD LAYER(c) | 6.2 | 4.3 | 9.2 | 3.7 |
| DISTRIBUTION OF AVERAGE PORE DIAMETER($\mu$m) | | (a) < (b) < (c) | (a) < (b) < (c) | (a) < (b) < (c) | (a) < (b) < (c) |

TABLE 2-continued

|  |  |  |  |  |  |
|---|---|---|---|---|---|
| RATIO OF AVERAGE PORE DIAMETERS(μm) | THIRD LAYER(c)/ FIRST LAYER(a) | 6.8 | 7.0 | 7.1 | 11.2 |
| INNER DIAMETER(mm) |  | 1.55 | 1.55 | 1.55 | 1.55 |
| OUTER DIAMETER(mm) |  | 2.48 | 2.48 | 2.48 | 2.48 |
| AVERAGE MEMBRANE THICKNESS(mm) |  | 0.465 | 0.465 | 0.465 | 0.465 |
| RATIO OF OUTER DIAMETER TO INNER DIAMETER |  | 1.60 | 1.60 | 1.60 | 1.60 |
| REJECTION PORE DIAMETER(μm) |  | 0.6 | 0.6 | 0.7 | 0.4 |
| POROSITY(%) |  | 80 | 80 | 80 | 80 |
| POLYVINYL PYRROLIDONE CONTENT(mass %) |  | 0.5 | 0.9 | 0.5 | 1.3 |

TABLE 3

|  | EXAMPLE 1 | EXAMPLE 2 | EXAMPLE 3 | EXAMPLE 4 | EXAMPLE 5 |
|---|---|---|---|---|---|
| REPETITIVE FATIGUE STRENGTH(TIMES) | 23200 | 35700 | 10500 | 21100 | 23400 |
| INSTANTANEOUS BURSTING STRENGTH(MPa) | 1.3 | 1.6 | 1 | 1.2 | 1.3 |
| BEER PERMEABILITY(L/m2) | 1020 | 310 | 1230 | 1000 | 950 |
| YEAST CONCENTRATION OF PERMEATED BEER(cells/cc) | 0 | 0 | 0 | 0 | 0 |
| TURBIDITY OF PERMEATED BEER(NTU) | 7.5 | 6.8 | 4.3 | 7.3 | 7.8 |
| WATER PERMEABILITY MAINTENANCE RATE AFTER FILTRATION(%) | 56 | 52 | 62 | 54 | 60 |
| WATER PERMEABILITY MAINTENANCE RATE AFTER BACK WASH(%) | 96 | 92 | 94 | 75 | 82 |
| REPETITIVE FATIGUE | G | E | F | G | G |
| INSTANEOUS BURSTING | G | E | G | G | G |
| BEER PERMEABILITY | G | F | G | G | G |
| WATER PERMEABILITY MAINTENANCE RATE AFTER BACK WASH | G | G | G | F | F |

|  | EXAMPLE 6 | EXAMPLE 7 | EXAMPLE 8 | EXAMPLE 9 |
|---|---|---|---|---|
| REPETITIVE FATIGUE STRENGTH(TIMES) | 21500 | 24600 | 18300 | 27900 |
| INSTANTANEOUS BURSTING STRENGTH(MPa) | 1.2 | 1.4 | 1.3 | 1.4 |
| BEER PERMEABILITY(L/m2) | 990 | 730 | 1320 | 450 |
| YEAST CONCENTRATION OF PERMEATED BEER(cells/cc) | 0 | 0 | 0 | 0 |
| TURBIDITY OF PERMEATED BEER(NTU) | 7.4 | 5.8 | 12.8 | 3.9 |
| WATER PERMEABILITY MAINTENANCE RATE AFTER FILTRATION(%) | 57 | 62 | 60 | 57 |
| WATER PERMEABILITY MAINTENANCE RATE AFTER BACK WASH(%) | 52 | 92 | 86 | 93 |
| REPETITIVE FATIGUE | G | G | G | G |
| INSTANEOUS BURSTING | G | G | G | G |
| BEER PERMEABILITY | G | G | G | F |
| WATER PERMEABILITY MAINTENANCE RATE AFTER BACK WASH | P | G | F | G |

TABLE 4

| | | EXAMPLE 10 | EXAMPLE 11 | EXAMPLE 12 | EXAMPLE 13 | EXAMPLE 14 |
|---|---|---|---|---|---|---|
| MEMBRANE-FORMING SOLUTION COMPONENT | HYDROPHOBIC POLYMER | POLYSULFONE | POLYSULFONE | POLYSULFONE | POLYSULFONE | POLYSULFONE |
| | SOLVENT | NMP | NMP | NMP | NMP | NMP |
| | HYDROPHILIC POLYMER | PVP k90 | PVP k90 | PVP k90 | PVP k90 | PVP k90 |
| | NON-SOLVENT | GLYCERIN | GLYCERIN | GLYCERIN | GLYCERIN | GLYCERIN |
| MEMBRANE-FORMING SOLUTION COMPOSITON(wt %) | HYDROPHOBIC POLYMER | 20 | 20 | 20 | 20 | 20 |
| | SOLVENT | 64.5 | 64.5 | 64.5 | 64.5 | 64.5 |
| | HYDROPHILIC POLYMER | 10 | 10 | 10 | 10 | 10 |
| | NON-SOLVENT | 5.5 | 5.5 | 5.5 | 5.5 | 5.5 |
| INTERNAL SOLIDIFICATION LIQUID COMPOSITION | | NMP 90 wt % AQUEOUS SOLUTION | NMP 75 wt % AQUEOUS SOLUTION | NMP 98 wt % AQUEOUS SOLUTION | NMP 65 wt % AQUEOUS SOLUTION | NMP 50 wt % AQUEOUS SOLUTION |
| EXTERNAL SOLIDIFICATION LIQUID COMPOSITION | | PURE WATER | PURE WATER | PURE WATER | PURE WATER | PURE WATER |
| AIR-GAP TIME(s) | | 0.49 | 0.49 | 0.49 | 0.49 | 0.49 |
| WINDING SPEED (m/min) | | 10.5 | 10.5 | 10.5 | 10.5 | 10.5 |
| PRESENCE OF HOLLOW CYLINDRICAL OBJECT | | YES | YES | YES | YES | YES |
| IMMERSION DEPTH OF HOLLOW CYLINDRICAL OBJECT IN EXTERNAL SOLIDIFICATION LIQUID(mm) | | 50 | 50 | 50 | 50 | 50 |
| RETENTION TIME IN SECTION OF EXTERNAL SOLIDIFICATION LIQUID HAVING SAME TEMPERATURE AS AIR-GAP PORTION(s) | | 0.29 | 0.29 | 0.29 | 0.29 | 0.29 |
| TEMPERATURE OF AIR-GAP PORTION COVERED BY HOLLOW CYLINDRICAL OBJECT(° C.) | | 90.2 | 90.2 | 90.2 | 90.0 | 90.0 |
| RELATIVE HUMIDITY OF AIR-GAP PORTION COVERED BY HOLLOW CYLINDRICAL OBJECT(%) | | 100 | 100 | 100 | 100 | 100 |
| ABSOLUTE HUMIDITY OF AIR-GAP PORTION IN HOLLOW CYLINDRICAL OBJECT(g/m3) | | 432 | 432 | 432 | 429 | 429 |
| TEMPERATURE OF EXTERNAL SOLIDIFICATION LIQUID COVERED BY HOLLOW CYLINDRICAL OBJECT (° C.) | | 88.9 | 89.6 | 89.6 | 89.3 | 89.2 |
| DIFFERENCE IN TEMPERATURE BETWEEN AIR-GAP PORTION AND EXTERNAL SOLIDIFICATION LIQUID COVERED BY HOLLOW CYLINDRICAL OBJECT(° C.) | | 1.3 | 0.6 | 0.6 | 0.7 | 0.8 |
| WATER VAPOR AMOUNT OF AIR-GAP PORTION IN HOLLOW CYLINDRICAL OBJECT(g) | | 1.153 | 0.37 | 0.37 | 0.37 | 0.37 |

| | | EXAMPLE 15 | EXAMPLE 16 | EXAMPLE 17 | EXAMPLE 18 | EXAMPLE 19 |
|---|---|---|---|---|---|---|
| MEMBRANE-FORMING SOLUTION COMPONENT | HYDROPHOBIC POLYMER | POLYSULFONE | POLYSULFONE | POLYETHER-SULFONE | POLYSULFONE | PVDF |
| | SOLVENT | NMP | NMP | NMP | NMP | NMP |
| | HYDROPHILIC POLYMER | PVP k90 | PVP k30 | PVP k90 | PEG35k | PVP k90 |
| | NON-SOLVENT | GLYCERIN | GLYCERIN | GLYCERIN | GLYCERIN | GLYCERIN |
| MEMBRANE-FORMING SOLUTION COMPOSITON(wt %) | HYDROPHOBIC POLYMER | 20 | 20 | 20 | 20 | 18 |
| | SOLVENT | 64.5 | 62 | 64.5 | 62 | 65 |
| | HYDROPHILIC POLYMER | 10 | 15 | 10 | 15 | 14 |
| | NON-SOLVENT | 5.5 | 5 | 5.5 | 5 | 3 |
| INTERNAL SOLIDIFICATION LIQUID COMPOSITION | | NMP 90 wt % AQUEOUS SOLUTION | NMP 90 wt % AQUEOUS SOLUTION | NMP 75 wt % AQUEOUS SOLUTION | NMP 90 wt % AQUEOUS SOLUTION | NW 90 wt % AQUEOUS SOLUTION |
| EXTERNAL SOLIDIFICATION LIQUID COMPOSITION | | PURE WATER | PURE WATER | PURE WATER | PURE WATER | PURE WATER |
| AIR-GAP TIME(s) | | 0.49 | 0.49 | 0.49 | 0.49 | 0.49 |
| WINDING SPEED (m/min) | | 10.5 | 10.5 | 10.5 | 10.5 | 10.5 |
| PRESENCE OF HOLLOW CYLINDRICAL OBJECT | | YES | YES | YES | YES | YES |
| IMMERSION DEPTH OF HOLLOW | | 50 | 50 | 50 | 50 | 50 |

TABLE 4-continued

|  |  |  |  |  |  |
|---|---|---|---|---|---|
| CYLINDRICAL OBJECT IN EXTERNAL SOLIDIFICATION LIQUID(mm) |  |  |  |  |  |
| RETENTION TIME IN SECTION OF EXTERNAL SOLIDIFICATION LIQUID HAVING SAME TEMPERATURE AS AIR-GAP PORTION(s) | 0.29 | 0.29 | 0.29 | 0.29 | 0.29 |
| TEMPERATURE OF AIR-GAP PORTION COVERED BY HOLLOW CYLINDRICAL OBJECT(° C.) | 90.1 | 89.8 | 90.1 | 90.0 | 90.3 |
| RELATIVE HUMIDITY OF AIR-GAP PORTION COVERED BY HOLLOW CYLINDRICAL OBJECT(%) | 100 | 100 | 100 | 100 | 100 |
| ABSOLUTE HUMIDITY OF AIR-GAP PORTION IN HOLLOW CYLINDRICAL OBJECT(g/m3) | 431 | 426 | 431 | 429 | 434 |
| TEMPERATURE OF EXTERNAL SOLIDIFICATION LIQUID COVERED BY HOLLOW CYLINDRICAL OBJECT (° C.) | 88.9 | 89.1 | 88.9 | 89.3 | 89.3 |
| DIFFERENCE IN TEMPERATURE BETWEEN AIR-GAP PORTION AND EXTERNAL SOLIDIFICATION LIQUID COVERED BY HOLLOW CYLINDRICAL OBJECT(° C.) | 1.2 | 0.7 | 1.2 | 0.7 | 0.9 |
| WATER VAPOR AMOUNT OF AIR-GAP PORTION IN HOLLOW CYLINDRICAL OBJECT(g) | 0.37 | 0.36 | 0.37 | 0.37 | 0.37 |

TABLE 5

| | | EXAMPLE 10 | EXAMPLE 11 | EXAMPLE 12 | EXAMPLE 13 | EXAMPLE 14 |
|---|---|---|---|---|---|---|
| AVERAGE TRUNK SIZE(μm) | SECOND LAYER(b) | 1.6 | 3.3 | 2.3 | 2.6 | 2.2 |
|  | THIRD LAYER(c) | 5.2 | 4.0 | 8.4 | 3.5 | 2.7 |
| RATIO OF AVERAGE TRUNK SIZES | THIRD LAYER(c)/ SECOND LAYER(b) | 3.3 | 1.2 | 3.7 | 1.3 | 1.2 |
| AVERAGE TRUNK SIZE S(a1) OF FIRST LAYER COMPONENT (a1)(μM) | | 0.81 | 0.90 | 0.83 | 0.85 | 0.58 |
| PRESENCE OF LAYER HAVING AVERAGE TRUNK SIZE SMALLER THAN S(a1) | | YES | YES | YES | YES | YES |
| AVERAGE TRUNK SIZE OF LAYER HAVING SMALLER AVERAGE TRUNK SIZE OF S(a1)(μm) | | 0.56 | 0.39 | 0.74 | 0.37 | 0.36 |
| AVERAGE VALUE OF TEN LARGEST DIAMETER TRUNKS ON INNER SURFACE(SURFACE C)(μm) | | 65.1 | 35.6 | 60.3 | 13.5 | 3.2 |
| NUMBER OF PORES (IN NUMBER) | FIRST LAYER(a) | 120 | 112 | 129 | 130 | 120 |
|  | SECOND LAYER(b) | 50 | 24 | 38 | 76 | 84 |
|  | THIRD LAYER(c) | 21 | 20 | 9 | 86 | 137 |
| DISTRIBUTION OF NUMBERS OF PORES | | (a) > (b) > (c) | (a) > (b) > (c) | (a) > (b) > (c) | (a) > (b) > (c) | (c) > (a) > (b) |
| NUMBER OF PORES PRESENT IN FIRST LAYER COMPONENT(a1)(IN NUMBER) | | 10 | 8 | 10 | 14 | 19 |
| PRESENCE OF LAYER HAVING NUMBER OF PORES LARGER THAN FIRST LAYER COMPONENT(a1) | | YES | YES | YES | YES | YES |
| PORE DIAMETER OF OUTER SURFACE(SURFACE A)(μM) | | 25.3 | 4.5 | 5.2 | 4.0 | 3.6 |
| AVERAGE PORE DIAMETER (μm) | FIRST LAYER(a) | 2.5 | 0.83 | 0.90 | 0.86 | 0.81 |
|  | SECOND LAYER(b) | 5.9 | 3.5 | 3.4 | 4.2 | 5.2 |
|  | THIRD LAYER(c) | 13 | 4.8 | 7.5 | 4.6 | 1.6 |
| DISTRIBUTION OF AVERAGE PORE DIAMETER(μm) | | (a) < (b) < (c) | (a) < (b) < (c) | (a) < (b) < (c) | (a) < (b) < (c) | (a) < (b) < (c) |
| RATIO OF AVERAGE PORE DIAMETERS(μm) | THIRD LAYER(c)/ FIRST LAYER(a) | 5.2 | 5.8 | 8.3 | 5.3 | 2.0 |
| INNER DIAMETER(mm) | | 1.55 | 1.55 | 1.55 | 1.56 | 1.56 |
| OUTER DIAMETER(mm) | | 2.48 | 2.48 | 2.48 | 2.47 | 2.49 |
| AVERAGE MEMBRANE THICKNESS(mm) | | 0.465 | 0.465 | 0.465 | 0.455 | 0.465 |
| RATIO OF OUTER DIAMETER TO INNER DIAMETER | | 1.60 | 1.60 | 1.60 | 1.58 | 1.60 |
| REJECTION PORE DIAMETER(μm) | | 0.8 | 0.6 | 0.6 | 0.5 | 0.4 |
| POROSITY(%) | | 80 | 80 | 80 | 80 | 80 |
| POLYVINYL PYRROLIDONE CONTENT(mass %) | | 0.4 | 0.5 | 0.7 | 0.8 | 1 |

TABLE 5-continued

| | | EXAMPLE 15 | EXAMPLE 16 | EXAMPLE 17 | EXAMPLE 18 | EXAMPLE 19 |
|---|---|---|---|---|---|---|
| AVERAGE TRUNK SIZE(μm) | SECOND LAYER(b) | 1.9 | 2.6 | 3.5 | 2.9 | 2.2 |
| | THIRD LAYER(c) | 7.1 | 3.1 | 3.9 | 3.3 | 10.3 |
| RATIO OF AVERAGE TRUNK SIZES | THIRD LAYER(c)/ SECOND LAYER(b) | 3.7 | 1.2 | 1.1 | 1.1 | 4.0 |
| AVERAGE TRUNK SIZE S(a1) OF FIRST LAYER COMPONENT (a1)(μM) | | 0.92 | 0.23 | 1.1 | 0.21 | 0.81 |
| PRESENCE OF LAYER HAVING AVERAGE TRUNK SIZE SMALLER THAN S(a1) | | YES | YES | YES | YES | YES |
| AVERAGE TRUNK SIZE OF LAYER HAVING SMALLER AVERAGE TRUNK SIZE OF S(a1)(μm) | | 0.65 | 0.19 | 0.39 | 0.18 | 0.63 |
| AVERAGE VALUE OF TEN LARGEST DIAMETER TRUNKS ON INNER SURFACE(SURFACE C)(μm) | | 72.1 | 27.4 | 26.9 | 29.1 | 77.0 |
| NUMBER OF PORES (IN NUMBER) | FIRST LAYER(a) | 189 | 192 | 84 | 186 | 101 |
| | SECOND LAYER(b) | 79 | 121 | 26 | 113 | 44 |
| | THIRD LAYER(c) | 26 | 35 | 21 | 32 | 13 |
| DISTRIBUTION OF NUMBERS OF PORES | | (a) > (b) > (c) | (a) > (b) > (c) | (a) > (b) > (c) | (a) > (b) > (c) | (a) > (b) > (c) |
| NUMBER OF PORES PRESENT IN FIRST LAYER COMPONENT(a1)(IN NUMBER) | | 12 | 20 | 7 | 22 | 11 |
| PRESENCE OF LAYER HAVING NUMBER OF PORES LARGER THAN FIRST LAYER COMPONENT(a1) | | YES | YES | YES | YES | YES |
| PORE DIAMETER OF OUTER SURFACE(SURFACE A)(μM) | | 4.7 | 1.9 | 3.5 | 1.7 | 4.0 |
| AVERAGE PORE DIAMETER (μm) | FIRST LAYER(a) | 0.72 | 0.32 | 0.82 | 0.30 | 0.66 |
| | SECOND LAYER(b) | 3.7 | 1.6 | 3.7 | 1.5 | 2.3 |
| | THIRD LAYER(c) | 6.8 | 3.4 | 4.7 | 3.4 | 6.8 |
| DISTRIBUTION OF AVERAGE PORE DIAMETER(μm) | | (a) < (b) < (c) | (a) < (b) < (c) | (a) < (b) < (c) | (a) < (b) < (c) | (a) < (b) < (c) |
| RATIO OF AVERAGE PORE DIAMETERS(μm) | THIRD LAYER(c)/ FIRST LAYER(a) | 9.4 | 10.6 | 5.7 | 11.3 | 10.3 |
| INNER DIAMETER(mm) | | 1.55 | 1.55 | 1.55 | 1.55 | 1.54 |
| OUTER DIAMETER(mm) | | 3.5 | 2.48 | 2.48 | 2.48 | 2.48 |
| AVERAGE MEMBRANE THICKNESS(mm) | | 0.975 | 0.465 | 0.465 | 0.465 | 0.47 |
| RATIO OF OUTER DIAMETER TO INNER DIAMETER | | 2.26 | 1.60 | 1.60 | 1.60 | 1.61 |
| REJECTION PORE DIAMETER(μm) | | 0.6 | 0.3 | 0.3 | 0.3 | 0.6 |
| POROSITY(%) | | 80 | 80 | 80 | 80 | 77 |
| POLYVINYL PYRROLIDONE CONTENT(mass %) | | 0.6 | 9.5 | 0.8 | — | 0.5 |

TABLE 6

| | EXAMPLE 10 | EXAMPLE 11 | EXAMPLE 12 | EXAMPLE 13 | EXAMPLE 14 |
|---|---|---|---|---|---|
| REPETITIVE FATIGUE STRENGTH(TIMES) | 15300 | 22000 | 23100 | 25200 | 28000 |
| INSTANTANEOUS BURSTING STRENGTH(MPa) | 1.2 | 1.4 | 1.3 | 1.4 | 1.5 |
| BEER PERMEABILITY(L/m2) | 1400 | 510 | 1060 | 220 | 110 |
| YEAST CONCENTRATION OF PERMEATED BEER(cells/cc) | 0 | 0 | 0 | 0 | 0 |
| TURBIDITY OF PERMEATED BEER(NTU) | 15.3 | 7.2 | 6.9 | 5.9 | 4.6 |
| WATER PERMEABILITY MAINTENANCE RATE AFTER FILTRATION(%) | 53 | 47 | 62 | 42 | 35 |
| WATER PERMEABILITY MAINTENANCE RATE AFTER BACK WASH(%) | 73 | 96 | 94 | 93 | 96 |
| REPETITIVE FATIGUE | G | G | G | G | G |
| INSTANEOUS BURSTING | G | G | G | G | E |
| BEER PERMEABILITY | G | G | G | F | F |
| WATER PERMEABILITY MAINTENANCE RATE AFTER BACK WASH | F | G | G | G | G |

| | EXAMPLE 15 | EXAMPLE 16 | EXAMPLE 17 | EXAMPLE 18 | EXAMPLE 19 |
|---|---|---|---|---|---|
| REPETITIVE FATIGUE STRENGTH(TIMES) | 38400 | 12000 | 20500 | 11700 | 120500 |
| INSTANTANEOUS BURSTING STRENGTH(MPa) | 1.7 | 0.9 | 1.3 | 0.9 | 1.4 |

TABLE 6-continued

| BEER PERMEABILITY(L/m2) | 430 | 750 | 530 | 350 | 880 |
|---|---|---|---|---|---|
| YEAST CONCENTRATION OF PERMEATED BEER(cells/cc) | 0 | 0 | 0 | 0 | 0 |
| TURBIDITY OF PERMEATED BEER(NTU) | 6.2 | 3.7 | 6.5 | 3.3 | 7.2 |
| WATER PERMEABILITY MAINTENANCE RATE AFTER FILTRATION(%) | 54 | 60 | 56 | 58 | 58 |
| WATER PERMEABILITY MAINTENANCE RATE AFTER BACK WASH(%) | 91 | 99 | 86 | 65 | 88 |
| REPETITIVE FATIGUE | E | F | G | F | E |
| INSTANEOUS BURSTING | E | F | G | F | E |
| BEER PERMEABILITY | F | G | G | F | G |
| WATER PERMEABILITY MAINTENANCE RATE AFTER BACK WASH | G | G | F | P | F |

Next, comparative examples will be described. Table 7 shows production conditions of hollow fiber membranes of Comparative Examples 1 to 8, and Table 8 shows properties of the obtained hollow fiber membranes, and Table 9 shows evaluation results of the obtained hollow fiber membranes.

Comparative Example 1

A hollow fiber membrane was prepared by using a similar method to Example 1, except that only the air-gap portion was covered by the hollow cylindrical object that can control temperature, and external solidification liquid located under the air-gap portion was not covered. At this time, the temperature of the air-gap portion was controlled to about 90° C., and a relative humidity was controlled to 100%. Further, the temperature of the inside of the external solidification liquid was controlled to about 84° C.

An actually measured temperature of the air-gap portion and an actually measured temperature of the external solidification liquid at its surface were 90.0° C. and 81.2° C. respectively, and the temperatures were different from each other.

In the membrane obtained in Comparative Example 1, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

Comparative Example 2

A hollow fiber membrane was prepared by using a similar method to Example 1, except that only the air-gap portion was covered by the hollow cylindrical object that can control temperature, and external solidification liquid located under the air-gap portion was not covered. At this time, the temperature of the air-gap portion was controlled to about 84° C., and a relative humidity was controlled to 100%. Further, the temperature of the inside of the external solidification liquid was controlled to about 84° C.

An actually measured temperature of the air-gap portion and an actually measured temperature of the external solidification liquid at its surface were 84.3° C. and 81.0° C. respectively, and the temperatures were different from each other.

In the obtained membrane, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

Comparative Example 3

A hollow fiber membrane was prepared by using a similar method to Example 2, except that only the air-gap portion was covered by the hollow cylindrical object that can control temperature, and external solidification liquid located under the air-gap portion was not covered. At this time, the temperature of the air-gap portion was controlled to about 90° C., and a relative humidity was controlled to 100%. Further, the inside of the external solidification liquid was controlled to about 84° C.

An actually measured temperature of the air-gap portion and an actually measured temperature of the external solidification liquid at its surface were 90.0° C. and 80.1° C. respectively, and the temperatures were different from each other.

In the obtained membrane, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

Comparative Example 4

18 wt % polysulfone and 15 wt % PVP (Luvitec k80 manufactured by BASF Corporation) were dissolved in 62 wt % NMP at 70° C. by stirring, and 5 wt % glycerin was added and stirred to prepare membrane-forming solution. Meanwhile, mixture solution of 90 wt % NMP and 10 wt % pure water was prepared as internal solidification liquid. The temperature of the membrane-forming solution was controlled to 61° C., and the membrane-forming solution was discharged from an outside path of the double tubular nozzle and the internal solidification liquid was discharged from the inside path of the double tubular nozzle simultaneously.

Then, the membrane-forming solution was passed through an air-gap portion of 50 mm for 0.46 second, and the membrane-forming solution was solidified by the external solidification liquid of pure water at 80° C. A hollow fiber porous membrane was prepared by being wound up at a spinning rate of 6.5 m/min. The temperature of a bath retaining the external solidification liquid was controlled to 75° C. At this time, only the air-gap portion through which the membrane passes was covered by a hollow cylindrical object having a base area of 38 cm², and which can control temperature, and the external solidification liquid located under the portion was not covered. In this state, the temperature of the air-gap portion was controlled to 75° C., and relative humidity was controlled to 100% (absolute humidity of 240 g/m³).

At this time, an actually measured temperature of the air-gap portion and an actually measured temperature of the external solidification liquid were 75.0° C. and 70.2° C. respectively, and it was confirmed that the temperatures were different from each other.

The volume of the air-gap portion in the hollow cylindrical object was 190 cm³, and a water vapor amount was 0.05 g. Then, after solvent was removed from the porous membrane in water, PVP was decomposed in sodium hypochlorite aqueous solution having free available chlorine concentration of 2000 ppm for 15 hours, and then, washed with hot water at 90° C. for 3 hours. Accordingly, a porous hollow fiber membrane was obtained. The obtained hollow fiber membrane had an inner diameter of 1.41 mm, an outer diameter of 2.32 mm, and the ratio of the outer diameter to the inner diameter was 1.65.

In the obtained membrane, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

Comparative Example 5

A hollow fiber membrane was prepared by using a similar method to Example 9, except that only the air-gap portion was covered by the hollow cylindrical object that can control temperature, and external solidification liquid located under the air-gap portion was not covered. At this time, the temperature of the air-gap portion was controlled to about 90° C., and a relative humidity was controlled to 100%. Further, the inside of the external solidification liquid was controlled to about 84° C.

An actually measured temperature of the air-gap portion and an actually measured temperature of the external solidification liquid at its surface were 89.8° C. and 80.3° C. respectively, and the temperatures were different from each other.

In the obtained membrane, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

Comparative Example 6

A hollow fiber membrane was prepared by using a similar method to Example 14, except that only the air-gap portion was covered by the hollow cylindrical object that can control temperature, and external solidification liquid located under the air-gap portion was not covered. At this time, the temperature of the air-gap portion was controlled to about 90° C., and a relative humidity was controlled to 100%. Further, the inside of the external solidification liquid was controlled to about 84° C.

An actually measured temperature of the air-gap portion and an actually measured temperature of the external solidification liquid at its surface were 90.0° C. and 80.4° C. respectively, and the temperatures were different from each other.

In the obtained membrane, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

Comparative Example 7

A hollow fiber membrane was prepared by using a similar method to Example 15, except that only the air-gap portion was covered by the hollow cylindrical object that can control temperature, and external solidification liquid located under the air-gap portion was not covered. At this time, the temperature of the air-gap portion was controlled to about 90° C., and a relative humidity was controlled to 100%. Further, the inside of the external solidification liquid was controlled to about 84° C.

An actually measured temperature of the air-gap portion and an actually measured temperature of the external solidification liquid at its surface were 90.1° C. and 79.9° C. respectively, and the temperatures were different from each other.

In the obtained membrane, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

Comparative Example 8

A hollow fiber membrane was prepared by using a similar method to Example 18, except that only the air-gap portion was covered by the hollow cylindrical object that can control temperature, and external solidification liquid located under the air-gap portion was not covered. At this time, the temperature of the air-gap portion was controlled to about 90° C., and a relative humidity was controlled to 100%. Further, the inside of the external solidification liquid was controlled to about 84° C.

An actually measured temperature of the air-gap portion and an actually measured temperature of the external solidification liquid at its surface were 90.0° C. and 80.3° C. respectively, and the temperatures were different from each other.

In the obtained membrane, no continuous layer component of 10 μm having an average trunk size smaller than average trunk size S(a1) of the first layer component (a1) was present in the first layer (a) to the third layer (c) other than the first layer component (a1).

In the obtained membrane, a repetitive fatigue strength was low, and the result showed that the membrane would not be usable for a long period time in conditions where filtration/back wash would be repeated.

TABLE 7

| | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| MEMBRANE-FORMING SOLUTION COMPONENT | HYDROPHOBIC POLYMER | POLYSULFONE | POLYSULFONE | POLYSULFONE | POLYSULFONE |
| | SOLVENT | NMP | NMP | NMP | NMP |
| | HYDROPHILIC POLYMER | PVP k90 | PVP k90 | PVP k90 | PVP k80 |
| | NON-SOLVENT | GLYCERIN | GLYCERIN | GLYCERIN | GLYCERIN |
| MEMBRANE-FORMING SOLUTION COMPOSITION(wt %) | HYDROPHOBIC POLYMER | 20 | 20 | 22 | 18 |
| | SOLVENT | 64.5 | 64.5 | 62.5 | 62 |
| | HYDROPHILIC POLYMER | 10 | 10 | 10 | 15 |
| | NON-SOLVENT | 5.5 | 5.5 | 5.5 | 5 |
| INTERNAL SOLIDIFICATION LIQUID COMPOSITION | | NMP 90 wt % AQUEOUS SOLUTION | NMP 90 wt % AQUEOUS SOLUTION | NMP 90 wt % AQUEOUS SOLUTION | NMP 90 wt % AQUEOUS SOLUTION |
| EXTERNAL SOLIDIFICATION LIQUID COMPOSITION | | PURE WATER | PURE WATER | PURE WATER | PURE WATER |
| AIR-GAP TIME(s) | | 0.49 | 0.49 | 0.49 | 0.46 |
| WINDING SPEED (m/min) | | 10.5 | 10.5 | 10.5 | 6.5 |
| PRESENCE OF HOLLOW CYLINDRICAL OBJECT | | NO(ONLY AIR-GAP PORTION) | NO(ONLY AIR-GAP PORTION) | NO(ONLY AIR-GAP PORTION) | NO(ONLY AIR-GAP PORTION) |
| IMMERSION DEPTH OF HOLLOW CYLINDRICAL OBJECT IN EXTERNAL SOLIDIFICATION LIQUID(mm) | | — | — | — | — |
| RETENTION TIME IN SECTION OF EXTERNAL SOLIDIFICATION LIQUID HAVING SAME TEMPERATURE AS AIR-GAP PORTION(s) | | — | — | — | — |
| TEMPERATURE OF AIR-GAP PORTION COVERED BY HOLLOW CYLINDRICAL OBJECT(° C.) | | 90.0 | 84.3 | 90.0 | 75.0 |
| RELATIVE HUMIDITY OF AIR-GAP PORTION COVERED BY HOLLOW CYLINDRICAL OBJECT(%) | | 100 | 100 | 100 | 100 |
| ABSOLUTE HUMIDITY OF AIR-GAP PORTION IN HOLLOW CYLINDRICAL OBJECT(g/m3) | | 429 | 349 | 429 | 240 |
| TEMPERATURE OF EXTERNAL SOLIDIFICATION LIQUID COVERED BY HOLLOW CYLINDRICAL OBJECT (° C.) | | 81.2 | 81 | 80.1 | 70.2 |
| DIFFERENCE IN TEMPERATURE BETWEEN AIR-GAP PORTION AND EXTERNAL SOLIDIFICATION LIQUID COVERED BY HOLLOW CYLINDRICAL OBJECT(° C.) | | 8.8 | 3.3 | 9.9 | 4.8 |
| WATER VAPOR AMOUNT OF AIR-GAP PORTION IN HOLLOW CYLINDRICAL OBJECT(g) | | 0.37 | 0.30 | 0.37 | 0.05 |

| | | COMPARATIVE EXAMPLE 5 | COMPARATIVE EXAMPLE 6 | COMPARATIVE EXAMPLE 7 | COMPARATIVE EXAMPLE 8 |
|---|---|---|---|---|---|
| MEMBRANE-FORMING SOLUTION COMPONENT | HYDROPHOBIC POLYMER | POLYSULFONE | POLYSULFONE | POLYSULFONE | POLYSULFONE |
| | SOLVENT | NMP | NMP | NMP | NMP |
| | HYDROPHILIC POLYMER | PVP k90 | PVP k90 | PVP k90 | PEG35k |
| | NON-SOLVENT | GLYCERIN | GLYCERIN | GLYCERIN | GLYCERIN |
| MEMBRANE-FORMING SOLUTION COMPOSITION(wt %) | HYDROPHOBIC POLYMER | 20 | 20 | 20 | 20 |
| | SOLVENT | 64.5 | 64.5 | 64.5 | 62 |
| | HYDROPHILIC POLYMER | 10 | 10 | 10 | 15 |
| | NON-SOLVENT | 5.5 | 5.5 | 5.5 | 5 |

TABLE 7-continued

| | | | | |
|---|---|---|---|---|
| INTERNAL SOLIDIFICATION LIQUID COMPOSITION | NMP 90 wt % AQUEOUS SOLUTION | NMP 50 wt % AQUEOUS SOLUTION | NMP 90 wt % AQUEOUS SOLUTION | NMP 90 wt % AQUEOUS SOLUTION |
| EXTERNAL SOLIDIFICATION LIQUID COMPOSITION | PURE WATER | PURE WATER | PURE WATER | PURE WATER |
| AIR-GAP TIME(s) | 0.14 | 0.49 | 0.49 | 0.49 |
| WINDING SPEED (m/min) | 10.5 | 10.5 | 10.5 | 10.5 |
| PRESENCE OF HOLLOW CYLINDRICAL OBJECT | NO(ONLY AIR-GAP PORTION) | NO(ONLY AIR-GAP PORTION) | NO(ONLY AIR-GAP PORTION) | NO(ONLY AIR-GAP PORTION) |
| IMMERSION DEPTH OF HOLLOW CYLINDRICAL OBJECT IN EXTERNAL SOLIDIFICATION LIQUID(mm) | — | — | — | — |
| RETENTION TIME IN SECTION OF EXTERNAL SOLIDIFICATION LIQUID HAVING SAME TEMPERATURE AS AIR-GAP PORTION(s) | — | — | — | — |
| TEMPERATURE OF AIR-GAP PORTION COVERED BY HOLLOW CYLINDRICAL OBJECT(° C.) | 89.8 | 90.0 | 90.1 | 90.0 |
| RELATIVE HUMIDITY OF AIR-GAP PORTION COVERED BY HOLLOW CYLINDRICAL OBJECT(%) | 100 | 100 | 100 | 100 |
| ABSOLUTE HUMIDITY OF AIR-GAP PORTION IN HOLLOW CYLINDRICAL OBJECT(g/m3) | 426 | 429 | 431 | 429 |
| TEMPERATURE OF EXTERNAL SOLIDIFICATION LIQUID COVERED BY HOLLOW CYLINDRICAL OBJECT (° C.) | 80.3 | 80.4 | 79.9 | 80.3 |
| DIFFERENCE IN TEMPERATURE BETWEEN AIR-GAP PORTION AND EXTERNAL SOLIDIFICATION LIQUID COVERED BY HOLLOW CYLINDRICAL OBJECT(° C.) | 9.5 | 9.6 | 10.2 | 9.7 |
| WATER VAPOR AMOUNT OF AIR-GAP PORTION IN HOLLOW CYLINDRICAL OBJECT(g) | 0.0075 | 0.37 | 0.37 | 0.37 |

TABLE 8

| | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| AVERAGE TRUNK SIZE(μm) | SECOND LAYER(b) | 1.5 | 2.6 | 2.6 | 1.6 |
| | THIRD LAYER(c) | 5.3 | 9.7 | 9.7 | 4.2 |
| RATIO OF AVERAGE TRUNK SIZES | THIRD LAYER(c)/ SECOND LAYER(b) | 3.5 | 3.7 | 3.7 | 2.6 |
| AVERAGE TRUNK SIZE S(a1) OF FIRST LAYER COMPONENT | | 0.44 | 0.4 | 0.4 | 0.42 |
| PRESENCE OF LAYER HAVING AVERAGE TRUNK SIZE SMALLER THAN S(a1) | | NO | NO | NO | NO |
| AVERAGE TRUNK SIZE OF LAYER HAVING SMALLER AVERAGE TRUNK SIZE OF S(a1)(μm) | | — | — | — | — |
| AVERAGE VALUE OF TEN LARGEST DIAMETER TRUNKS ON INNER SURFACE(SURFACE C)(μm) | | 53.8 | 59.2 | 75.4 | 31.1 |
| NUMBER OF PORES (IN NUMBER) | FIRST LAYER(a) | 119 | 72 | 72 | 160 |
| | SECOND LAYER(b) | 48 | 34 | 34 | 50 |
| | THIRD LAYER(c) | 15 | 10 | 10 | 22 |
| DISTRIBUTION OF NUMBERS OF PORES | | (a) > (b) > (c) | (a) > (b) > (c) | (a) > (b) > (c) | (a) > (b) > (c) |
| NUMBER OF PORES PRESENT IN FIRST LAYER COMPONENT(a1)(IN NUMBER) | | 13 | 17 | 17 | 10 |
| PRESENCE OF LAYER HAVING NUMBER OF PORES LARGER THAN FIRST LAYER COMPONENT(a1) | | NO | NO | NO | NO |
| PORE DIAMETER ON OUTER SURFACE(SURFACE A)(μm) | | 4.1 | 3.5 | 2.8 | 2.3 |
| AVERAGE PORE DIAMETER (μm) | FIRST LAYER(a) | 0.61 | 0.52 | 0.49 | 0.54 |
| | SECOND LAYER(b) | 2.1 | 1.9 | 1.5 | 2.1 |
| | THIRD LAYER(c) | 5.8 | 6.1 | 6.1 | 6.0 |

TABLE 8-continued

|  |  |  |  |  |  |
|---|---|---|---|---|---|
| DISTRIBUTION OF AVERAGE PORE DIAMETER(μm) | | (a) < (b) < (c) | (a) < (b) < (c) | (a) < (b) < (c) | (a) < (b) < (c) |
| RATIO OF AVERAGE PORE DIAMETERS(μm) | THIRD LAYER(c)/ FIRST LAYER(a) | 9.5 | 11.7 | 12.4 | 11.1 |
| INNER DIAMETER(mm) | | 1.54 | 1.51 | 1.59 | 1.41 |
| OUTER DIAMETER(mn) | | 2.49 | 2.44 | 2.53 | 2.32 |
| AVERAGE MEMBRANE THICKNESS(mm) | | 0.475 | 0.465 | 0.47 | 0.455 |
| RATIO OF OUTER DIAMETER TO INNER DIAMETER | | 1.62 | 1.62 | 1.59 | 1.65 |
| REJECTION PORE DIAMETER(μm) | | 0.6 | 0.6 | 0.6 | 0.4 |
| POROSITY(%) | | 80 | 80 | 78 | 82 |
| POLYVINYL PYRROLIDONE CONTENT(mass %) | | 0.6 | 0.7 | 0.6 | 1.2 |

|  |  | COMPARATIVE EXAMPLE 5 | COMPARATIVE EXAMPLE 6 | COMPARATIVE EXAMPLE 7 | COMPARATIVE EXAMPLE 8 |
|---|---|---|---|---|---|
| AVERAGE TRUNK SIZE(μm) | SECOND LAYER(b) | 1.2 | 2 | 2.2 | 2.9 |
|  | THIRD LAYER(c) | 4.1 | 2.5 | 7.3 | 3.1 |
| RATIO OF AVERAGE TRUNK SIZES | THIRD LAYER(c)/ SECOND LAYER(b) | 3.4 | 1.3 | 3.3 | 1.1 |
| AVERAGE TRUNK SIZE S(a1) OF FIRST LAYER COMPONENT | | 0.38 | 0.41 | 0.68 | 0.13 |
| PRESENCE OF LAYER HAVING AVERAGE TRUNK SIZE SMALLER THAN S(a1) | | NO | NO | NO | NO |
| AVERAGE TRUNK SIZE OF LAYER HAVING SMALLER AVERAGE TRUNK SIZE OF S(a1)(μm) | | — | — | — | — |
| AVERAGE VALUE OF TEN LARGEST DIAMETER TRUNKS ON INNER SURFACE(SURFACE C)(μm) | | 72.3 | 2.5 | 68.8 | 24.8 |
| NUMBER OF PORES (IN NUMBER) | FIRST LAYER(a) | 102 | 127 | 199 | 190 |
|  | SECOND LAYER(b) | 52 | 78 | 83 | 105 |
|  | THIRD LAYER(c) | 15 | 146 | 30 | 31 |
| DISTRIBUTION OF NUMBERS OF PORES | | (a) > (b) > (c) | (c) > (a) > (b) | (a) > (b) > (c) | (a) > (b) > (c) |
| NUMBER OF PORES PRESENT IN FIRST LAYER COMPONENT(a1)(IN NUMBER) | | 15 | 21 | 32 | 25 |
| PRESENCE OF LAYER HAVING NUMBER OF PORES LARGER THAN FIRST LAYER COMPONENT(a1) | | NO | NO | NO | NO |
| PORE DIAMETER ON OUTER SURFACE(SURFACE A)(μm) | | 0.5 | 3.3 | 4.9 | 1.5 |
| AVERAGE PORE DIAMETER (μm) | FIRST LAYER(a) | 0.35 | 0.77 | 0.66 | 0.32 |
|  | SECOND LAYER(b) | 1.0 | 5.1 | 3.9 | 1.9 |
|  | THIRD LAYER(c) | 3.7 | 1.6 | 7.2 | 3.6 |
| DISTRIBUTION OF AVERAGE PORE DIAMETER(μm) | | (a) < (b) < (c) | (a) < (b) < (c) | (a) < (b) < (c) | (a) < (b) < (c) |
| RATIO OF AVERAGE PORE DIAMETERS(μm) | THIRD LAYER(c)/ FIRST LAYER(a) | 10.6 | 2.1 | 10.9 | 11.3 |
| INNER DIAMETER(mm) | | 1.52 | 1.58 | 1.53 | 1.55 |
| OUTER DIAMETER(mn) | | 2.45 | 2.49 | 3.52 | 2.48 |
| AVERAGE MEMBRANE THICKNESS(mm) | | 0.465 | 0.455 | 0.995 | 0.465 |
| RATIO OF OUTER DIAMETER TO INNER DIAMETER | | 1.61 | 1.58 | 2.30 | 1.60 |
| REJECTION PORE DIAMETER(μm) | | 0.6 | 0.4 | 0.6 | 0.3 |
| POROSITY(%) | | 80 | 80 | 80 | 80 |
| POLYVINYL PYRROLIDONE CONTENT(mass %) | | 1.3 | 1 | 0.6 | — |

TABLE 9

|  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| REPETITIVE FATIGUE STRENGTH(TIMES) | 6300 | 6700 | 8700 | 4100 |
| INSTANTANEOUS BURSTING STRENGTH(MPa) | 1.3 | 1.3 | 1.5 | 1 |
| BEER PERMEABILITY(L/m2) | 1000 | 860 | 300 | 1200 |
| YEAST CONCENTRATION OF PERMEATED BEER(cells/cc) | 0 | 0 | 0 | 0 |
| TURBIDITY OF PERMEATED BEER(NTU) | 7.2 | 6.5 | 4.1 | 3.7 |

TABLE 9-continued

|  |  |  |  |  |
|---|---|---|---|---|
| WATER PERMEABILITY MAINTENANCE RATE AFTER FILTRATION(%) | 63 | 55 | 55 | 65 |
| WATER PERMEABILITY MAINTENANCE RATE AFTER BACK WASH(%) | 85 | 78 | 80 | 85 |
| REPETITIVE FATIGUE | P | P | P | P |
| INSTANEOUS BURSTING | G | G | E | G |
| BEER PERMEABILITY | G | G | F | G |
| WATER PERMEABILITY MAINTENANCE RATE AFTER BACK WASH | F | F | F | F |

|  | COMPARATIVE EXAMPLE 5 | COMPARATIVE EXAMPLE 6 | COMPARATIVE EXAMPLE 7 | COMPARATIVE EXAMPLE 8 |
|---|---|---|---|---|
| REPETITIVE FATIGUE STRENGTH(TIMES) | 6730 | 7500 | 9000 | 4500 |
| INSTANTANEOUS BURSTING STRENGTH(MPa) | 1.3 | 1.5 | 1.7 | 0.9 |
| BEER PERMEABILITY(L/m2) | 480 | 110 | 400 | 790 |
| YEAST CONCENTRATION OF PERMEATED BEER(cells/cc) | 0 | 0 | 0 | 0 |
| TURBIDITY OF PERMEATED BEER(NTU) | 3.4 | 4.3 | 6 | 3.3 |
| WATER PERMEABILITY MAINTENANCE RATE AFTER FILTRATION(%) | 57 | 38 | 60 | 58 |
| WATER PERMEABILITY MAINTENANCE RATE AFTER BACK WASH(%) | 82 | 75 | 73 | 63 |
| REPETITIVE FATIGUE | P | P | P | P |
| INSTANEOUS BURSTING | G | E | E | F |
| BEER PERMEABILITY | F | F | F | G |
| WATER PERMEABILITY MAINTENANCE RATE AFTER BACK WASH | F | F | F | F |

The invention claimed is:

1. A porous membrane comprising:
   hydrophobic polymer as a main component,
   a first layer (a) including surface A and a 10 µm-thick first layer component a1 continuing from surface A, said first layer component having an average trunk size S(a1);
   a central second layer (b);
   a third layer (c) including surface C; and
   another 10 µm-thick continuous layer component,
   wherein the thickness of the membrane is equally divided between the first layer (a), the central second layer (b), and the third layer (c),
   wherein an average trunk size of the third layer (c) is larger than the average trunk size of the central second layer (b), and
   wherein the average trunk size of the another layer component is smaller than an average trunk size S(a1) of the first layer component.

2. The porous membrane, as defined in claim 1, wherein an average pore diameter on the surface A is 1.0 µm or greater and less than 20 µm.

3. The porous membrane, as defined in claim 1, wherein the number of pores of the first layer (a)>the number of pores of the central second layer (b)>the number of pores of the third layer (c) is satisfied.

4. The porous membrane, as defined in claim 1, wherein an average pore diameter of the first layer (a)<an average pore diameter of the central second layer (b)<an average pore diameter of the third layer (c) is satisfied, and the average pore diameter of the third layer (c) is at least 3.0 times as large as that of the first layer (a).

5. The porous membrane, as defined in claim 1, wherein the porous membrane has a hollow fiber shape.

6. The porous membrane, as defined in claim 5, wherein the surface A is an outer surface, and the surface C is an inner surface.

7. The porous membrane, as defined in claim 5, wherein the ratio of the outer diameter to the inner diameter of the porous membrane is 1.4 or greater and less than 2.5.

8. The porous membrane, as defined in claim 5, wherein the inner diameter of the porous membrane is 1000 µm or greater and less than 2000 µm.

9. The porous membrane, as defined in claim 1, wherein a rejection pore diameter of the porous membrane is 0.1 µm or greater and less than 1 µm.

10. The porous membrane, as defined in claim 1, wherein the porosity of the porous membrane is 75% or greater and less than 90%.

11. The porous membrane, as defined in claim 1, wherein an average value of ten largest diameter trunks present on the surface C is 40 µm or greater.

12. The porous membrane, as defined in claim 1, wherein base material constituting the porous membrane is polysulfone-based polymer.

13. The porous membrane, as defined in claim 1, wherein the porous membrane includes polyvinyl pyrrolidone.

14. The porous membrane, as defined in claim 1, wherein the porous membrane includes polysulfone-based polymer, hydrophilic polymer, solvent of polysulfone-based polymer, and non-solvent of polysulfone-based polymer.

15. The porous membrane, as defined in claim 1,
wherein the average trunk size S(a1) of the first layer component is 0.3 µm or greater.
16. The porous membrane, as defined in claim 15,
wherein the average trunk size S(a1) of the first layer component is less than the average trunk size of the central second layer (b) and the average trunk size of the third layer (c), and 0.3 µm or greater.
17. The porous membrane, as defined in claim 1,
wherein the average trunk size of the third layer (c) is 3.0 µm or greater.
18. A method for producing clarified liquid, comprising:
filtering liquid including suspension substance by the porous membrane as defined in claim 1.
19. The method for producing clarified liquid, as defined in claim 18,
wherein the liquid including the suspension substance is fermented liquid.
20. The method for producing clarified liquid, as defined in claim 19,
wherein the fermented liquid is beer fermented liquid.
21. The method for producing clarified liquid, as defined in claim 18,
wherein the filtration is inside-out filtration.
22. The method for producing clarified liquid, as defined in claim 18, further comprising:
performing reverse flow washing on the porous membrane by using filtrate obtained in the filtration step.
23. A porous membrane module, comprising:
the porous membrane as defined in claim 19.
24. A method for producing beer, comprising:
fermenting liquid including at least malt; and
filtering the liquid in which fermented yeast is dispersed,
wherein the filtering uses a porous membrane in which pore diameters change in the thickness direction of the membrane, and
wherein the thickness of the porous membrane is equally divided between a first layer (a), a central second layer (b), and a third layer (c),
wherein an average trunk size of the third layer (c) is larger than the average trunk size of the central second layer (b), and
wherein the average trunk size of another 10 µm-thick layer component is smaller than an average trunk size S(a1) of the first layer component.
25. A method for producing beer, comprising at least:
fermenting liquid including at least malt;
filtering a first liquid in which fermented yeast is dispersed by a porous membrane;
back washing a liquid for cleaning the porous membrane in a reverse direction to the direction of filtering the first liquid after the first filtration step; and
filtering, after back washing, a second liquid in which fermented yeast is dispersed by the porous membrane on which the back washing was performed,
wherein the thickness of the porous membrane is equally divided between a first layer (a), a central second layer (b), and a third layer (c),
wherein an average trunk size of the third layer (c) is larger than the average trunk size of the second layer (b), and
wherein the average trunk size of another 10 µm-thick layer component is smaller than an average trunk size S(a1) of the first layer component.
26. A method for producing a porous membrane, comprising:
causing internal solidification liquid to flow out from an inside flow path of a double tubular nozzle, and causing membrane-forming solution including hydrophobic polymer and solvent to flow out from an outside flow path of the double tubular nozzle simultaneously; and
solidifying the membrane-forming solution in external solidification liquid after the membrane-forming solution has passed through an air-gap portion,
wherein the temperature of the air-gap portion and the temperature of a surface of the external solidification liquid located vertically under the air-gap portion are controlled to be equal to each other.
27. The method for producing a porous membrane, as defined in claim 26,
wherein the temperature of the air-gap portion and the temperature of the external solidification liquid located vertically under the air-gap portion are controlled simultaneously by covering the air-gap portion and the external solidification liquid by a unitary hollow cylindrical object.
28. The method for producing a porous membrane, as defined in claim 27,
wherein a water vapor amount in the air-gap portion in the hollow cylindrical object is 0.01 g or greater and less than 1.0 g.
29. The method for producing a porous membrane, as defined in claim 27,
wherein the absolute humidity of the air-gap portion in the hollow cylindrical object is 300 g/m$^3$ or higher and lower than 540 g/m$^3$.
30. The method for producing a porous membrane, as defined in claim 26,
wherein the porous membrane resides in a section of the external solidification liquid having the temperature equal to the temperature of the air-gap portion for 0.1 second or longer.
31. The method for producing a porous membrane, as defined in claim 26,
wherein the external solidification liquid has higher solidifying power for the membrane-forming solution, compared with the internal solidification liquid, and includes water as a main component.
32. The method for producing a porous membrane, as defined in claim 26,
wherein the internal solidification liquid is aqueous solution including the solvent of the hydrophobic polymer at 70 wt % or greater and less than 100 wt %.
33. The method for producing a porous membrane, as defined in claim 26,
wherein the membrane-forming solution includes hydrophilic polymer.
34. The method for producing a porous membrane, as defined in claim 33,
wherein a part of the hydrophilic polymer is removed by using aqueous solution including oxidizing agent simultaneously with the solidification step, or after the solidification step.

* * * * *

UNITED STATES PATENT AND TRADEMARK OFFICE
CERTIFICATE OF CORRECTION

PATENT NO. : 10,898,864 B2
APPLICATION NO. : 16/083297
DATED : January 26, 2021
INVENTOR(S) : C. Sakakibara et al.

It is certified that error appears in the above-identified patent and that said Letters Patent is hereby corrected as shown below:

On the Title Page

Inventors, Line 10, please change "Hashing" to -- Hashino --

In the Claims

Column 55, Line 31 (Claim 23, Line 2) please change "in claim 19." to -- in claim 1. --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*